United States Patent
Xu et al.

(10) Patent No.: US 12,363,582 B2
(45) Date of Patent: Jul. 15, 2025

(54) METHOD FOR MANAGING QOS, RELAY TERMINAL, PCF NETWORK ELEMENT, SMF NETWORK ELEMENT, AND REMOTE TERMINAL

(71) Applicant: HUAWEI TECHNOLOGIES CO., LTD., Guangdong (CN)

(72) Inventors: Shengfeng Xu, Beijing (CN); Haiyang Sun, Beijing (CN); Yanmei Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 402 days.

(21) Appl. No.: 17/844,874

(22) Filed: Jun. 21, 2022

(65) Prior Publication Data

US 2022/0322135 A1    Oct. 6, 2022

Related U.S. Application Data

(63) Continuation of application No. PCT/CN2019/130222, filed on Dec. 30, 2019.

(51) Int. Cl.
*H04W 28/02* (2009.01)
*H04W 12/08* (2021.01)
*H04W 40/22* (2009.01)

(52) U.S. Cl.
CPC ....... *H04W 28/0268* (2013.01); *H04W 12/08* (2013.01); *H04W 28/0257* (2013.01); *H04W 40/22* (2013.01)

(58) Field of Classification Search
None
See application file for complete search history.

(56) References Cited

U.S. PATENT DOCUMENTS

2018/0279319 A1   9/2018   Yu et al.
2019/0349951 A1   11/2019  Ahmad
(Continued)

FOREIGN PATENT DOCUMENTS

| CN | 106162930 A | 11/2016 |
|----|-------------|---------|
| CN | 110366132 A | 10/2019 |
| WO | 2016210048 A1 | 12/2016 |
| WO | 2018067956 A1 | 4/2018 |

OTHER PUBLICATIONS

SA WG2, New SID: Study on System enhancement for Proximity based Services in 5GS. TSG SA Meeting #SP-83, Mar. 20-22, 2019, Shenzhen, China, SP-190186, 4 pages.
(Continued)

*Primary Examiner* — Hong Shao

(57) ABSTRACT

Embodiments of this application disclose a method for managing QoS, a relay terminal, a PCF network element, an SMF network element, and a remote terminal. The method includes: A relay terminal obtains QoS information from a network device, where the QoS information includes first QoS information and/or second QoS information, the first QoS information is used to transmit data of a remote terminal between the remote terminal and the relay terminal, and the second QoS information is used to transmit the data of the remote terminal between the relay terminal and a UPF network element; and the relay terminal sends the first QoS information to the remote terminal based on the QoS information. According to embodiments of this application, QoS from the remote terminal to a network side can be properly managed, and a requirement on service transmission from the remote terminal to the network side is ensured.

18 Claims, 12 Drawing Sheets

(56) References Cited

U.S. PATENT DOCUMENTS

2020/0383127 A1* 12/2020 Zhu ..................... H04W 72/12
2021/0058827 A1*  2/2021 Holmström ....... H04W 28/0263
2021/0410129 A1* 12/2021 Freda ................. H04W 72/543

OTHER PUBLICATIONS

3GPP TS 23.303 V15.1.0 (Jun. 2018), 3rd Generation Partnership Project; Technical Specification Group Services and System Aspects; Proximity-based services (ProSe); Stage 2(Release 15), 130 pages.
3GPP TS 23.401 V16.5.0 (Dec. 2019), 3rd Generation Partnership Project; Technical Specification Group Services and System Aspects; General Packet Radio Service (GPRS) enhancements for Evolved Universal Terrestrial Radio Access Network (E-UTRAN) access(Release 16), 436 pages.
3GPP TR 23.733 V15.1.0 (Dec. 2017), 3rd Generation Partnership Project; Technical Specification Group Services and System Aspects; Study on Architecture Enhancements to ProSe UE-to-Network Relay(Release 15), 81 pages.
3GPP TS 23.287 V16.1.0 (Dec. 2019), 3rd Generation Partnership Project; Technical Specification Group Services and System Aspects; Architecture enhancements for 5G System (5GS) to support Vehicle-to-Everything (V2X) services (Release 16), 51 pages.
Lenovo, Motorola Mobility, Considerations on QoS based resource pool for NR V2X. 3GPP TSG-RAN WG2 Meeting #107bis, ChongQing, China, Oct. 14-18, 2019, R2-1912914, 3 pages.

* cited by examiner

METHOD FOR MANAGING QOS, RELAY TERMINAL, PCF NETWORK ELEMENT, SMF NETWORK ELEMENT, AND REMOTE TERMINAL

CROSS-REFERENCE TO RELATED APPLICATIONS

This application is a continuation of International Application No. PCT/CN2019/130222, filed on Dec. 30, 2019, which is hereby incorporated by reference in their entireties.

TECHNICAL FIELD

This application relates to the field of communication technologies, and in particular, to a method for managing QoS, a relay terminal, a PCF network element, an SMF network element, and a remote terminal.

BACKGROUND

Device-to-device (D2D for short) communication allows direct communication between user equipment (UE for short), so that utilization of spectrum resources is effectively improved. When the UE is outside network coverage or a communication signal between the UE and a radio access network (RAN for short) is poor, a remote terminal (for example, Remote UE) may provide assistance via a relay terminal (for example, Relay UE). For example, communication between the remote terminal and a network side device is implemented through communication between the remote terminal and the relay terminal and communication between the relay terminal and the network side device.

In indirect communication in a 4th generation mobile communication technology (4G) system, quality of service (QoS) of data transmission between a remote terminal and a relay terminal is processed based on a data packet priority (ProSe Per-Packet Priority, PPPP) and data packet reliability (ProSe Per-Packet Reliability, PPPR), and QoS of data transmission between the relay terminal and a network side device is processed based on a bearer. In indirect communication in a 5th-generation mobile communication technology (5G) system, QoS management is performed on both data transmission (which may be referred to as first-segment data transmission) between a remote terminal and a relay terminal and data transmission (which may be referred to as second-segment data transmission) between the relay terminal and a network side device based on a QoS flow granularity. In addition, QoS management on the first-segment data transmission and QoS management on the second-segment data transmission are separately performed, and some QoS parameters (for example, a QoS parameter related to a transmission rate) of the first-segment data transmission and the second-segment data transmission may mismatch. Consequently, a requirement on service transmission from the remote terminal to a network side cannot be satisfied.

SUMMARY

A technical problem to be resolved in embodiments of this application is to provide a method for managing QoS, a relay terminal, a PCF network element, an SMF network element, and a remote terminal, to properly manage QoS from the remote terminal to a network side, and ensure a requirement on service transmission from the remote terminal to the network side.

According to a first aspect, an embodiment of this application provides a method for managing quality of service. The method may include:

A relay terminal obtains QoS information from a network device, where the QoS information includes first QoS information and/or second QoS information, the first QoS information is used to transmit data of a remote terminal between the remote terminal and the relay terminal, and the second QoS information is used to transmit the data of the remote terminal between the relay terminal and a user plane function UPF network element; and the relay terminal sends the first QoS information to the remote terminal based on the QoS information.

Because the first QoS information is used to transmit the data of the remote terminal, when the second QoS information exists, the second QoS information is also used to transmit the data of the remote terminal. The first QoS information and the second QoS information have a mutual mapping relationship in some QoS parameters. Therefore, the first QoS information and the second QoS information also have a mutual association relationship. A service transmission requirement of relay transmission from the remote terminal to a network side is considered in terms of both a transmission rate and a transmission delay of the first QoS information and a transmission rate and a transmission delay of the second QoS information. Therefore, end-to-end QoS transmission assurance can be provided for the remote terminal. For example, from a delay perspective, when transmission is performed according to an exist mechanism, two delays, namely, a delay from the remote terminal to the relay terminal and a delay from the relay terminal to the network side, may be greater than a service delay requirement of the remote terminal. In this case, an end-to-end transmission delay may be controlled through cooperation between first QoS information and the second QoS information that are associated with each other in this application. From a rate perspective, if two rates, namely, a rate from the remote terminal to the relay terminal and a rate from the relay terminal to the network side, are different, a data packet loss occurs on the relay terminal. Therefore, in this application, a packet loss rate may be controlled by keeping a rate parameter of the first QoS information consistent with a rate parameter of the second QoS information. Therefore, a relay transmission requirement from the remote terminal to the UPF network element is fully satisfied.

In a possible implementation, the QoS information includes the second QoS information and does not include the first QoS information, and that the relay terminal sends the first QoS information to the remote terminal based on the QoS information includes:

The relay terminal determines the first QoS information based on the second QoS information, and sends the first QoS information to the remote terminal.

When receiving only the second QoS information, the relay terminal may generate the first QoS information based on a QoS parameter in the second QoS information, so that there is a mapping relationship between the first QoS information and the second QoS information in some QoS parameters. Therefore, QoS management from the remote terminal to the relay terminal and QoS management from the relay terminal to the network side may be associated with each other, and a relay transmission requirement of the remote terminal is ensured.

In a possible implementation, that a relay terminal obtains QoS information includes:

The relay terminal receives the QoS information from a session management function SMF network element or a PCF network element.

In a possible implementation, the method further includes:

The relay terminal receives relay communication indication information from the remote terminal, where the relay communication indication information is used to indicate the remote terminal to perform relay communication.

When receiving the relay communication indication information, a device on the network side may learn that this transmission is relay transmission. Therefore, the relay communication indication information may directly indicate that a PDU session serves the relay communication of the remote terminal.

The relay terminal sends first identifier information of the remote terminal to the SMF network element based on the relay communication indication information.

The first identifier information may be an IP address or an ID of the remote terminal. When receiving an identifier that is of a non-relay terminal and that is reported by the relay terminal, or receiving identifiers that are of two terminals and that are reported by the relay terminal, a device on the network side may learn that this transmission is relay transmission. Therefore, the first identifier information of the remote terminal may be used to implicitly indicate that the PDU session serves the relay transmission of the remote terminal.

In a possible implementation, the method further includes:

The relay terminal sends second identifier information of the remote terminal to the SMF network element.

The second identifier information may be the IP address of the remote terminal. An AF network element may trigger, by using a mapping relationship between the IP address of the remote terminal and the PCF network element, the PCF network element to generate and deliver the QoS information.

In a possible implementation, the method further includes:

The relay terminal stores the QoS information.

The relay terminal locally stores the QoS information, so that the QoS information can be invoked at any time, and it is also convenient to generate, based on the locally stored QoS information, QoS information that may be required. For example, when the first QoS information is locally stored, and the second QoS information needs to be generated, the second QoS information may be generated based on the first QoS information. For another example, when fourth QoS information that requests for authorization from the PCF network element needs to be generated, the fourth QoS information may also be generated based on the first QoS information.

In a possible implementation, the method further includes:

The relay terminal obtains QoS flow information; and the relay terminal sends information about a first QoS flow to the remote terminal based on the QoS flow information, where the first QoS flow is used to carry the data of the remote terminal transmitted between the remote terminal and the relay terminal, where the QoS flow information includes the information about the first QoS flow and/or information about a second QoS flow, and the second QoS flow is used to carry the data of the remote terminal transmitted between the relay terminal and the user plane function UPF network element.

More parameters related to QoS management may be obtained by obtaining the related QoS flow information, to implement further refined QoS management on relay transmission from the remote terminal to the network side.

In a possible implementation, the QoS flow information includes the information about the second QoS flow and does not include the information about the first QoS flow, and that the relay terminal sends information about a first QoS flow to the remote terminal based on the QoS flow information includes:

The relay terminal determines the information about the first QoS flow based on the information about the second QoS flow, and sends the information about the first QoS flow to the remote terminal.

In a possible implementation, the method further includes:

The relay terminal stores the QoS flow information.

According to a second aspect, an embodiment of this application provides a method for managing quality of service. The method may include:

A relay terminal sends requested QoS information to a policy control function PCF network element, where the requested QoS information includes third QoS information that requests for authorization and/or fourth QoS information that requests for authorization, the third QoS information is used to transmit data of a remote terminal between the remote terminal and the relay terminal, and the fourth QoS information is used to transmit the data of the remote terminal between the relay terminal and a user plane function UPF network element; and the relay terminal receives authorization information that is of the requested QoS information and that is from the PCF network element.

In a possible implementation, the method further includes:

The relay terminal generates the requested QoS information;

the relay terminal receives the requested QoS information from the remote terminal; or the relay terminal receives the third QoS information from the remote terminal, and generates the fourth QoS information based on the third QoS information.

In a possible implementation, the authorization information is used to indicate that the requested QoS information has been authorized, or the authorization information includes authorized QoS information, where the authorized QoS information includes authorized fifth QoS information and/or authorized sixth QoS information, the fifth QoS information is used to transmit the data of the remote terminal between the remote terminal and the relay terminal, and the sixth QoS information is used to transmit the data of the remote terminal between the relay terminal and the UPF network element.

In a possible implementation, the authorized QoS information includes the sixth QoS information and does not include the fifth QoS information, and the method further includes:

The relay terminal determines the fifth QoS information based on the sixth QoS information, and sends the fifth QoS information to the remote terminal.

According to a third aspect, an embodiment of this application provides a method for managing quality of service. The method may include:

A policy control function PCF network element receives requested QoS information from a relay terminal, where the requested QoS information includes third QoS information that requests for authorization and/or fourth QoS information that requests for authorization, the third QoS information is used to transmit data of a remote terminal between the remote terminal and the relay terminal, and the fourth QoS information is used to transmit the data of the remote terminal between the relay terminal and a user plane function UPF network element; and the PCF network element sends authorization information of the requested QoS information to the relay terminal based on the requested QoS information.

In a possible implementation, that the PCF network element sends authorization information of the requested QoS information to the relay terminal based on the requested QoS information includes The PCF network element sends the authorization information to the relay terminal based on subscription information of the remote terminal and the requested QoS information;

the PCF network element sends the authorization information to the relay terminal based on subscription information of the remote terminal, subscription information of the relay terminal, and the requested QoS information;

the PCF network element sends the authorization information to the relay terminal based on subscription information and service information of the remote terminal and the requested QoS information; or the PCF network element sends the authorization information to the relay terminal based on subscription information and service information of the remote terminal, subscription information of the relay terminal, and the requested QoS information.

In a possible implementation, the authorization information is used to indicate that the requested QoS information has been authorized, or the authorization information includes authorized QoS information, where the authorized QoS information includes authorized fifth QoS information and/or authorized sixth QoS information, the fifth QoS information is used to transmit the data of the remote terminal between the remote terminal and the relay terminal, and the sixth QoS information is used to transmit the data of the remote terminal between the relay terminal and the user plane function UPF network element.

According to a fourth aspect, an embodiment of this application provides a method for managing quality of service. The method may include:

A session management function SMF network element receives QoS information from a policy control function PCF network element, where the QoS information includes first QoS information and/or second QoS information, the first QoS information is used to transmit data of a remote terminal between the remote terminal and a relay terminal, and the second QoS information is used to transmit the data of the remote terminal between the relay terminal and a user plane function UPF network element; and the SMF network element sends the QoS information to the relay terminal.

In a possible implementation, the method further includes:

The SMF network element generates QoS flow information based on the QoS information, and sends the QoS flow information to the relay terminal.

In a possible implementation, the QoS flow information includes information about a first QoS flow and/or information about a second QoS flow, the first QoS flow is used to carry the data of the remote terminal transmitted between the remote terminal and the relay terminal, the second QoS flow is used to carry the data of the remote terminal transmitted between the relay terminal and the user plane function UPF network element, and the information about the second QoS flow corresponds to the second QoS information.

In a possible implementation, the information about the first QoS flow includes flow rule information and flow identifier information of the first QoS flow.

In a possible implementation, the information about the second QoS flow includes flow rule information and flow identifier information of the second QoS flow.

According to a fifth aspect, an embodiment of this application provides a method for managing quality of service. The method may include:

A remote terminal sends relay communication indication information to a relay terminal, where the relay communication indication information is used to indicate the remote terminal to perform relay communication; and the remote terminal receives first QoS information from the relay terminal, where the first QoS information is used to transmit data of the remote terminal between the remote terminal and the relay terminal.

In a possible implementation, the relay communication indication information is carried in a data packet unit PDU session establishment request.

In a possible implementation, the first QoS information is associated with second QoS information, and the second QoS information is used to transmit the data of the remote terminal between the relay terminal and a user plane function UPF network element.

In a possible implementation, the method further includes:

The remote terminal receives information about a first QoS flow from the relay terminal, where the first QoS flow is used to carry the data of the remote terminal transmitted between the remote terminal and the relay terminal.

According to a sixth aspect, an embodiment of this application provides a method for managing quality of service. The method may include:

A policy control function PCF network element receives a first message from a session management function SMF network element or an application function AF network element, where the first message includes identifier information of a remote terminal; and the PCF network element sends QoS information to a relay terminal of the remote terminal based on the first message, where the QoS information includes first QoS information and/or second QoS information, the first QoS information is used to transmit data of the remote terminal between the remote terminal and the relay terminal, and the second QoS information is used to transmit the data of the remote terminal between the relay terminal and a user plane function UPF network element.

In a possible implementation, that the PCF network element sends QoS information to a relay terminal of the remote terminal based on the first message includes:

The PCF network element obtains the QoS information based on the first message, and sends the QoS information to the relay terminal;

when the first message further includes identifier information of the relay terminal or relay communication indication information, the PCF network element obtains the QoS information based on the first message, and sends the QoS information to the relay terminal, where the relay communication indication information is used to indicate the remote terminal to perform relay communication; or when the identifier information of the remote terminal is an IP address of the remote terminal, and the PCF network element determines, based on the identifier information of the remote terminal, that the remote terminal performs relay communication, the PCF network element obtains the QoS information based on the first message, and sends the QoS information to the relay terminal.

In a possible implementation, that the PCF network element obtains the QoS information based on the first message includes:

The PCF network element obtains subscription information of the remote terminal based on the first message; and the PCF network element obtains the QoS information based on the subscription information of the remote terminal.

In a possible implementation, that the PCF network element obtains the QoS information based on the subscription information of the remote terminal includes:

When the first message further includes the identifier information of the relay terminal, the PCF network element obtains the QoS information based on the subscription information of the remote terminal and subscription information of the relay terminal;

when the first message further includes service information of the remote terminal, the PCF network element obtains the QoS information based on the subscription information and the service information of the remote terminal; or when the first message further includes the identifier information of the relay terminal and service information of the remote terminal, the PCF network element obtains the QoS information based on the subscription information and the service information of the remote terminal and subscription information of the relay terminal.

According to a seventh aspect, an embodiment of this application provides a relay terminal. The relay terminal may include:

a transceiver unit, configured to obtain QoS information from a network device, where the QoS information includes first QoS information and/or second QoS information, the first QoS information is used to transmit data of a remote terminal between the remote terminal and the relay terminal, and the second QoS information is used to transmit the data of the remote terminal between the relay terminal and a user plane function UPF network element; and a processing unit, configured to send the first QoS information to the remote terminal based on the QoS information.

In a possible implementation, the QoS information includes the second QoS information and does not include the first QoS information, and the processing unit is specifically configured to:

determine the first QoS information based on the second QoS information, and send the first QoS information to the remote terminal.

In a possible implementation, the transceiver unit is specifically configured to:

receive the QoS information from a session management function SMF network element or a PCF network element.

In a possible implementation, the transceiver unit is further configured to:

receive relay communication indication information from the remote terminal, where the relay communication indication information is used to indicate the remote terminal to perform relay communication; and the processing unit is further configured to send first identifier information of the remote terminal to the SMF network element based on the relay communication indication information.

In a possible implementation, the processing unit is further configured to:

indicate the transceiver unit to send second identifier information of the remote terminal to the SMF network element.

In a possible implementation, the relay terminal further includes:

a storage unit, configured to store the QoS information.

In a possible implementation, the transceiver unit is further configured to:

obtain QoS flow information; and the processing unit is further configured to send information about a first QoS flow to the remote terminal based on the QoS flow information, where the first QoS flow is used to carry the data of the remote terminal transmitted between the remote terminal and the relay terminal, where the QoS flow information includes the information about the first QoS flow and/or information about a second QoS flow, and the second QoS flow is used to carry the data of the remote terminal transmitted between the relay terminal and the user plane function UPF network element.

In a possible implementation, the QoS flow information includes the information about the second QoS flow and does not include the information about the first QoS flow, and the processing unit is specifically configured to:

determine the information about the first QoS flow based on the information about the second QoS flow, and send the information about the first QoS flow to the remote terminal.

In a possible implementation, the storage unit is further configured to:

store the QoS flow information.

According to an eighth aspect, an embodiment of this application provides a relay terminal. The relay terminal may include:

a processing unit, configured to indicate a transceiver unit to send requested QoS information to a policy control function PCF network element, where the requested QoS information includes third QoS information that requests for authorization and/or fourth QoS information that requests for authorization, the third QoS information is used to transmit data of a remote terminal between the remote terminal and the relay terminal, and the fourth QoS information is used to transmit the data of the remote terminal between the relay terminal and a user plane function UPF network element; and the transceiver unit, configured to receive authorization information that is of the requested QoS information and that is from the PCF network element.

In a possible implementation, the processing unit is further configured to:

generate the requested QoS information;

the transceiver unit is further configured to receive the requested QoS information from the remote terminal; or the transceiver unit is further configured to receive the third QoS information from the remote terminal, and the processing unit is further configured to generate the fourth QoS information based on the third QoS information.

In a possible implementation, the authorization information is used to indicate that the requested QoS information has been authorized, or the authorization information includes authorized QoS information, where the authorized QoS information includes authorized fifth QoS information and/or authorized sixth QoS information, the fifth QoS information is used to transmit the data of the remote terminal between the remote terminal and the relay terminal, and the sixth QoS information is used to transmit the data of the remote terminal between the relay terminal and the UPF network element.

In a possible implementation, the authorized QoS information includes the sixth QoS information and does not include the fifth QoS information, and the processing unit is further configured to:

determine the fifth QoS information based on the sixth QoS information, and send the fifth QoS information to the remote terminal.

According to a ninth aspect, an embodiment of this application provides a policy control function PCF network element. The PCF network element may include:

a transceiver unit, configured to receive requested QoS information from a relay terminal, where the requested QoS information includes third QoS information that requests for authorization and/or fourth QoS information that requests for authorization, the third QoS information is used to transmit data of a remote terminal between the remote terminal and the relay terminal, and the fourth QoS information is used to transmit the data of the remote terminal between the relay terminal and a user plane function UPF network element; and a processing unit, configured to send authorization information of the requested QoS information to the relay terminal based on the requested QoS information.

In a possible implementation, the processing unit is specifically configured to:

send the authorization information to the relay terminal based on subscription information of the remote terminal and the requested QoS information;

send the authorization information to the relay terminal based on subscription information of the remote terminal, subscription information of the relay terminal, and the requested QoS information;

send the authorization information to the relay terminal based on subscription information and service information of the remote terminal and the requested QoS information; or send the authorization information to the relay terminal based on subscription information and service information of the remote terminal, subscription information of the relay terminal, and the requested QoS information.

In a possible implementation, the authorization information is used to indicate that the requested QoS information has been authorized, or the authorization information includes authorized QoS information, where the authorized QoS information includes authorized fifth QoS information and/or authorized sixth QoS information, the fifth QoS information is used to transmit the data of the remote terminal between the remote terminal and the relay terminal, and the sixth QoS information is used to transmit the data of the remote terminal between the relay terminal and the user plane function UPF network element.

According to a tenth aspect, an embodiment of this application provides a session management function SMF network element. The SMF network element may include:

a transceiver unit, configured to receive QoS information from a policy control function PCF network element, where the QoS information includes first QoS information and/or second QoS information, the first QoS information is used to transmit data of a remote terminal between the remote terminal and a relay terminal, and the second QoS information is used to transmit the data of the remote terminal between the relay terminal and a user plane function UPF network element; and send the QoS information to the relay terminal.

In a possible implementation, the SMF network element further includes:

a processing unit, configured to generate QoS flow information based on the QoS information, and send the QoS flow information to the relay terminal.

In a possible implementation, the QoS flow information includes information about a first QoS flow and/or information about a second QoS flow, the first QoS flow is used to carry the data of the remote terminal transmitted between the remote terminal and the relay terminal, the second QoS flow is used to carry the data of the remote terminal transmitted between the relay terminal and the user plane function UPF network element, and the information about the second QoS flow corresponds to the second QoS information.

In a possible implementation, the information about the first QoS flow includes flow rule information and flow identifier information of the first QoS flow.

In a possible implementation, the information about the second QoS flow includes flow rule information and flow identifier information of the second QoS flow.

According to an eleventh aspect, an embodiment of this application provides a remote terminal. The remote terminal may include:

a processing unit, configured to indicate a transceiver unit to send relay communication indication information to a relay terminal, where the relay communication indication information is used to indicate the remote terminal to perform relay communication; and the transceiver unit, configured to receive first QoS information from the relay terminal, where the first QoS information is used to transmit data of the remote terminal between the remote terminal and the relay terminal.

In a possible implementation, the relay communication indication information is carried in a data packet unit PDU session establishment request.

In a possible implementation, the first QoS information is associated with second QoS information, and the second QoS information is used to transmit the data of the remote terminal between the relay terminal and a user plane function UPF network element.

In a possible implementation, the transceiver unit is further configured to:

receive information about a first QoS flow from the relay terminal, where the first QoS flow is used to carry the data of the remote terminal transmitted between the remote terminal and the relay terminal.

According to a twelfth aspect, an embodiment of this application provides a policy control function PCF network element. The PCF network element may include:

a transceiver unit, configured to receive a first message from a session management function SMF network element or an application function AF network element, where the first message includes identifier information of a remote terminal; and a processing unit, configured to send QoS information to a relay terminal of the remote terminal based on the first message, where the QoS information includes first QoS information and/or second QoS information, the first QoS information is used to transmit data of the remote terminal between the remote terminal and the relay terminal, and the second QoS information is used to transmit the data of the remote terminal between the relay terminal and a user plane function UPF network element.

In a possible implementation, the processing unit is specifically configured to obtain the QoS information based on the first message, and send the QoS information to the relay terminal;

when the first message further includes identifier information of the relay terminal or relay communication indication information, the processing unit is specifically configured to obtain the QoS information based on the first message, and send the QoS information to the relay terminal, where the relay communication indication information is used to indicate the remote terminal to perform relay communication; or when the identifier information of the remote terminal is an IP address of the remote terminal, and the processing unit determines, based on the identifier information of the remote terminal, that the remote terminal performs relay communication, the processing unit is specifically configured to obtain the QoS information based on the first message, and send the QoS information to the relay terminal.

In a possible implementation, the processing unit is specifically configured to:

obtain subscription information of the remote terminal based on the first message; and obtain the QoS information based on the subscription information of the remote terminal.

In a possible implementation, when the first message further includes the identifier information of the relay terminal, the processing unit is specifically configured to obtain the QoS information based on the subscription information of the remote terminal and subscription information of the relay terminal;

when the first message further includes service information of the remote terminal, the processing unit is specifically configured to obtain the QoS information based on the subscription information and the service information of the remote terminal; or when the first message further includes the identifier information of the relay terminal and service information of the remote terminal, the processing unit is specifically configured to obtain the QoS information based on the subscription information and the service information of the remote terminal and subscription information of the relay terminal.

According to a thirteenth aspect, an embodiment of this application provides a relay terminal. The relay terminal may include:

a processor, a memory, and a bus, where the processor and the memory are connected by using the bus, the memory is configured to store a group of program code, and the processor is configured to invoke the program code stored in the memory to perform the method according to any one of the first aspect, the implementations of the first aspect, the second aspect, or the implementations of the second aspect in embodiments of this application.

According to a fourteenth aspect, an embodiment of this application provides a policy control function PCF network element. The PCF network element may include:

a processor, a memory, and a bus, where the processor and the memory are connected by using the bus, the memory is configured to store a group of program code, and the processor is configured to invoke the program code stored in the memory to perform the method according to any one of the third aspect, the implementations of the third aspect, the sixth aspect, or the implementations of the sixth aspect in embodiments of this application.

According to a fifteenth aspect, an embodiment of this application provides a session management function SMF network element. The SMF network element may include:

a processor, a memory, and a bus, where the processor and the memory are connected by using the bus, the memory is configured to store a group of program code, and the processor is configured to invoke the program code stored in the memory to perform the method according to any one of the fourth aspect or the implementations of the fourth aspect in embodiments of this application.

According to a sixteenth aspect, an embodiment of this application provides a remote terminal. The remote terminal may include:

a processor, a memory, and a bus, where the processor and the memory are connected by using the bus, the memory is configured to store a group of program code, and the processor is configured to invoke the program code stored in the memory to perform the method according to any one of the fifth aspect or the implementations of the fifth aspect in embodiments of this application.

According to a seventeenth aspect, an embodiment of this application provides a computer-readable storage medium. The computer-readable storage medium stores instructions, and when the instructions are run on a computer, the method according to any one of the first aspect, the implementations of the first aspect, the second aspect, or the implementations of the second aspect is implemented.

According to an eighteenth aspect, an embodiment of this application provides a computer-readable storage medium. The computer-readable storage medium stores instructions, and when the instructions are run on a computer, the method according to any one of the third aspect, the implementations of the third aspect, the sixth aspect, or the implementations of the sixth aspect is implemented.

According to a nineteenth aspect, an embodiment of this application provides a computer-readable storage medium. The computer-readable storage medium stores instructions, and when the instructions are run on a computer, the method according to any one of the fourth aspect or the implementations of the fourth aspect is implemented.

According to a twentieth aspect, an embodiment of this application provides a computer-readable storage medium. The computer-readable storage medium stores instructions, and when the instructions are run on a computer, the method according to any one of the fifth aspect or the implementations of the fifth aspect is implemented.

According to a twenty-first aspect, a computer program product is provided. The computer program product includes computer program code, and when the computer program code is run on a computer, the computer is enabled to perform the method according to any one of the first aspect, the implementations of the first aspect, the second aspect, or the implementations of the second aspect.

According to a twenty-second aspect, a computer program product is provided. The computer program product includes computer program code, and when the computer program code is run on a computer, the computer is enabled to perform the method according to any one of the third aspect, the implementations of the third aspect, the sixth aspect, or the implementations of the sixth aspect.

According to a twenty-third aspect, a computer program product is provided. The computer program product includes computer program code, and when the computer program code is run on a computer, the computer is enabled to perform the method according to any one of the fourth aspect or the implementations of the fourth aspect.

According to a twenty-fourth aspect, a computer program product is provided. The computer program product includes computer program code, and when the computer program code is run on a computer, the computer is enabled to perform the method according to any one of the fifth aspect or the implementations of the fifth aspect.

According to a twenty-fifth aspect, an embodiment of this application provides a system for managing QoS. The system may include:

the relay terminal according to any one of the seventh aspect or the implementations of the seventh aspect, or according to any one of the eighth aspect or the implementations of the eighth aspect;

the policy control function PCF network element according to any one of the ninth aspect or the implementations of the ninth aspect, or according to any one of the twelfth aspect or the implementations of the twelfth aspect;

the session management function SMF network element according to any one of the tenth aspect or the implementations of the tenth aspect; and the remote terminal according to any one of the eleventh aspect or the implementations of the eleventh aspect.

According to a twenty-sixth aspect, an embodiment of this application provides a communication apparatus. The communication apparatus may be a relay terminal, or a chip or a system-on-a-chip in the terminal. The communication apparatus includes a processor, the processor is coupled to a memory, the memory is configured to store a computer program or instructions, and the processor is configured to execute the computer program or the instructions in the memory, to enable the communication apparatus to perform the method according to any one of the first aspect or the implementations of the first aspect, or the method according to any one of the second aspect or the implementations of the second aspect. Optionally, the communication apparatus further includes the memory.

According to a twenty-seventh aspect, an embodiment of this application provides a communication apparatus. The communication apparatus may be a PCF network element, or a chip or a system-on-a-chip in the PCF network element. The communication apparatus includes a processor, the processor is coupled to a memory, the memory is configured to store a computer program or instructions, and the processor is configured to execute the computer program or the instructions in the memory, to enable the communication apparatus to perform the method according to any one of the third aspect or the implementations of the third aspect, or the method according to any one of the sixth aspect or the implementations of the sixth aspect. Optionally, the communication apparatus further includes the memory.

According to a twenty-eighth aspect, an embodiment of this application provides a communication apparatus. The communication apparatus may be an SMF network element, or a chip or a system-on-a-chip in the SMF network element. The communication apparatus includes a processor, the processor is coupled to a memory, the memory is configured to store a computer program or instructions, and the processor is configured to execute the computer program or the instructions in the memory, to enable the communication apparatus to perform the method according to any one of the fourth aspect or the implementations of the fourth aspect. Optionally, the communication apparatus further includes the memory.

According to a twenty-ninth aspect, an embodiment of this application provides a communication apparatus. The communication apparatus may be a remote terminal, or a chip or a system-on-a-chip in the remote terminal. The communication apparatus includes a processor, the processor is coupled to a memory, the memory is configured to store a computer program or instructions, and the processor is configured to execute the computer program or the instructions in the memory, to enable the communication apparatus to perform the method according to any one of the fifth aspect or the implementations of the fifth aspect. Optionally, the communication apparatus further includes the memory.

BRIEF DESCRIPTION OF DRAWINGS

To describe the technical solutions in embodiments of this application or in the background more clearly, the following briefly describes the accompanying drawings for describing embodiments of this application or the background.

DESCRIPTION OF EMBODIMENTS

The following describes embodiments of this application with reference to the accompanying drawings in embodiments of this application.

The terms "including", "having", or any other variant thereof in this application are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
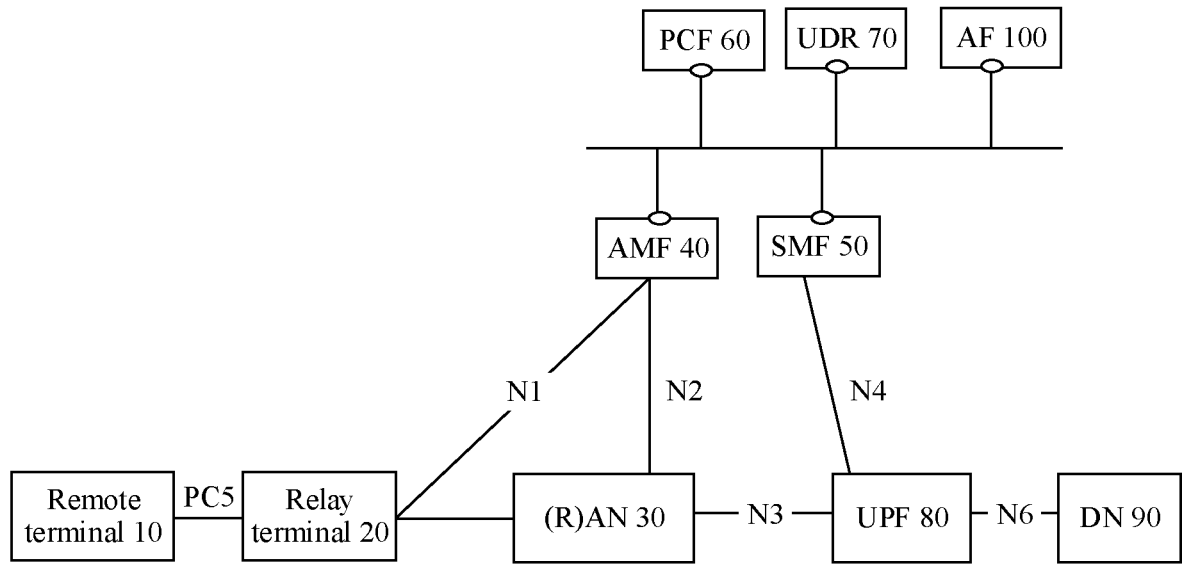
FIG. 1 is a schematic diagram of a system architecture to which a method for managing QoS is applied according to an embodiment of this application.

FIG. 1 is a schematic diagram of an architecture of a communication system.

It should be noted that the system architecture uses a 5G system as an example, but is not limited to the 5G system. The system architecture may alternatively be applied to a 4G system or any system after the 5G system. In addition, all embodiments of this application may be applied to the system architecture shown in FIG. 1.

The system architecture may include but is not limited to a remote terminal 10, a relay terminal 20, a radio access network (RAN) device 30, an access and mobility management function (AMF for short) network element 40, a session management function (SMF for short) network element 50, and a policy control function (PCF for short) network element 60.

The remote terminal 10 and the relay terminal 20 may be various terminal devices. Further, the terminal device may include user equipment, a handheld terminal, a notebook computer, a cellular phone, a smartphone, a tablet computer, a handheld device, an augmented reality (AR for short) device, a virtual reality (VR for short) device, a machine-type communication terminal, a communication terminal carried on an unmanned aerial vehicle, or another device that can access a network. In Internet of Vehicles communication, the terminal device may include a vehicle-mounted communication terminal and a road side unit (RSU for short).

It should be noted that the remote terminal 10 and the relay terminal 20 may communicate with each other by using an air interface technology such as a new radio (NR for short) technology or long term evolution (LTE for short). The remote terminal 10 and the relay terminal 20 are connected through a PC5 interface. The relay terminal 20 and the RAN device 30 may also communicate with each other by using an air interface technology (for example, an NR or LTE technology).

The (radio) access network device (R)AN 30 is mainly responsible for functions such as radio resource management, service quality management, and data compression and encryption. The radio access network device 30 may include various forms of base stations, such as a macro base station, a micro base station, a relay station, and an access point. In systems using different radio access technologies, a device having a base station function may have different names. For example, in a 5th generation (5G for short) mobile communication technology system, the device is referred to as a gNB. This is not limited in this application.

The AMF network element 40 is mainly responsible for functions such as access control, mobility management, attachment and detachment, and gateway selection. When the AMF network element provides a service for a session of the terminal device, the AMF network element may further be configured to provide a control plane storage resource for the session, to store a session identifier, an SMF network element identifier associated with the session identifier, and the like.

The SMF network element 50 is mainly responsible for user plane network element selection, user plane network element redirection, Internet protocol (IP for short) address allocation, bearer establishment, modification, and release, QoS control, and the like.

The PCF network element 60 is mainly responsible for supporting a unified policy framework for managing and controlling a network behavior, providing a policy rule for a control plane function, and obtaining, from a unified data repository (UDR for short) network element 70, user information related to policy decision, and the like.

The UDR network element 70 is mainly configured to store and provide subscription information of the terminal.

The UPF network element 80 is mainly responsible for receiving and forwarding user data of the terminal device. For example, the UPF network element may receive user data from a data network, and transmit the user data to the terminal device by using an access network device. The UPF network element may further receive user data from the terminal device by using the access network device, and forward the user data to the data network (DN for short) 90.

In addition, the system architecture may further include an application function (AF for short) network element 100.

The AF network element 100 is mainly configured to provide a service QoS policy requirement, a routing policy requirement, and the like for the 5G network.

Specifically, uplink transmission is used as an example. In the architecture shown in FIG. 1, the remote terminal 10 may access a network (for example, the RAN device 30) by using the relay terminal 20, to implement indirect communication between the remote terminal and the network. Data transmission of the remote terminal 10 may pass through two paths: a path from the remote terminal 10 to the relay terminal 20 and a path from the relay terminal 20 to the UPF network element 70. QoS processing of data transmission from the remote terminal 10 to the relay terminal 20 may be based on a PC5 QoS model, and QoS processing of data transmission from the relay terminal 20 to the UPF network element 70 may be based on a 5G QoS model.

The 5G QoS model may be a model for managing and configuring QoS based on a QoS flow in the 5G system. The 5G QoS model supports a guaranteed bit rate (GBR for short) QoS flow (GBR QoS Flow) and a non-guaranteed bit rate QoS flow (Non-GBR QoS Flow), and the 5G QoS model further supports reflective QoS.

The QoS flow is a QoS differentiation granularity in a PDU session. In the 5G system, the QoS flow may be identified by using a quality of service flow identifier (QFI for short). Same forwarding processing (for example, same scheduling or a same admission threshold) may be performed on user plane data with a same QFI in the PDU session.

Content of the QoS flow may include:

a QoS profile configured for the RAN, where the QoS profile may be provided by the SMF network element for the RAN device by using the AMF network element, or may be preset in the RAN device, which is not limited; and a QoS rule configured for the terminal, where the rule may be provided by the SMF network element for the terminal device in a PDU session establishment or modification process, or may be derived by the terminal device according to a reflective QoS facility.

Whether a resource type of a QoS flow is a GBR QoS flow or a non-GBR QoS flow may be specifically determined based on a QoS profile. For example, a QoS profile of the GBR QoS flow usually includes the following QoS parameters: a 5G QoS identifier (5QI for short), an allocation and retention priority (ARP for short), a guaranteed flow bit rate (GFBR for short), and a maximum flow bit rate (MFBR for short). However, a QoS profile of the non-GBR QoS flow usually does not include the GFBR and the MFBR.

Optionally, the QoS profile includes QoS notification control (QNC for short). GBR QoS flows are classified, based on whether the QoS profile includes the QNC, into a GRB QoS flow that requires the QNC and a GBR QoS flow that does not require the QNC.

For the non-GBR QoS flow, the corresponding QoS profile usually includes the following QoS parameters: a 5QI and an ARP, and optionally includes a reflective QoS attribute (RQA for short).

Related definitions of the related QoS parameters in the 5G QoS flow model are as follows:

5QI: The 5QI is used to index a 5G QoS feature value. The 5QI is classified into a standardized 5QI, a preconfigured 5QI, and a dynamically allocated 5QI. The standardized 5QIs are in a one-to-one correspondence with a group of standardized 5G QoS feature values. A 5G QoS feature value corresponding to the preconfigured 5QI is preconfigured in a radio access network device. A 5G QoS feature value corresponding to the dynamically allocated 5QI is included in the QoS profile and sent to the RAN.

The 5G QoS feature value may include one or more of the following: a resource type (RT for short) such as a GBR or a non-GBR, a priority level, a data packet delay budget, a data packet error rate, a maximum data burst volume, or an average window (averaging window). The average window may be used to calculate a rate corresponding to the GBR, and the data packet delay budget may be a delay of a data packet from UE to a UPF.

ARP: The ARP includes a priority level, a pre-emption capability, and a pre-emption vulnerability.

RQA: The RQA is used to indicate whether reflective QoS is used for a service transmitted on a current QoS flow.

QNC: The QNC is used to indicate whether a RAN notifies a network when a GFBR of a GBR QoS flow cannot be satisfied.

GFBR: The GFBR is used to indicate a bit rate guaranteed to be provided for a GBR QoS flow.

MFBR: The MFBR is used to indicate a bit rate limited to be provided for a GBR QoS flow, namely, a maximum bit rate provided for the GBR QoS flow.

In D2D communication based on the 5G system, a QoS flow-based PC5 QoS model is used, which is similar to the 5G QoS model. One or more links may be established between two terminal devices, and one or more QoS flows may be established on each link. Each QoS flow may be identified by using a PC5 QoS flow identifier (PFI for short), and the PFI may uniquely identify one QoS flow on a link. PC5 QoS supports a GBR QoS flow and a non-GBR QoS flow. Related PC5 QoS parameters in the PC5 QoS model include a PQI, a PC5 flow bit rate (PC5 Flow Bit Rate), and a PC5 link aggregate bit rate. The PQI is a special 5QI. Each PQI value has a one-to-one mapping with a QoS feature value. Content included in the QoS feature value is the same as that in the 5G QoS model. The PC5 flow bit rate includes a guaranteed flow bit rate (GFBR) and a maximum flow bit rate (MFBR).

Embodiments of this application may be applied to a scenario in which a remote terminal performs relay transmission. For example, in the architecture shown in FIG. 1, the remote terminal 10 communicates with a network side by using the relay terminal 20. In addition, in embodiments of this application, QoS management on end-to-end data transmission of a remote terminal may include: configuring a QoS parameter from the remote terminal to a relay terminal and a QoS parameter from the relay terminal to a UPF network element. Because both the QoS parameters are configured based on relay transmission performed for the remote terminal, a service transmission requirement of the remote terminal can be ensured.

The following describes a method for managing QoS in this application in detail with reference to FIG. 2 to FIG. 9.

Figure 2:
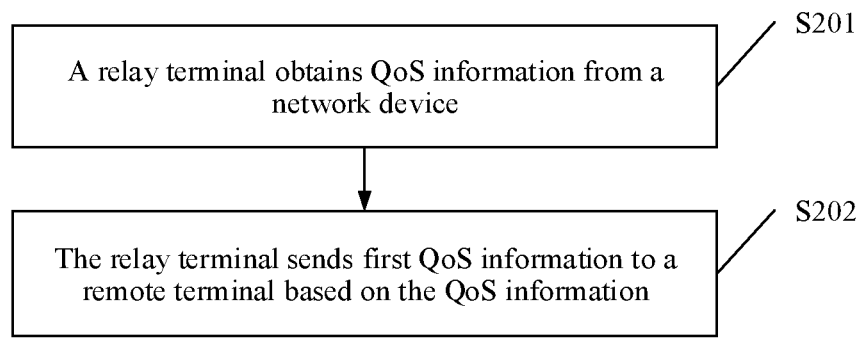
FIG. 2 is a schematic flowchart of a method for managing QoS according to an embodiment of this application.

FIG. 2 is a schematic flowchart of a method for managing QoS according to an embodiment of this application. The method may include the following steps.

S201: A relay terminal obtains QoS information from a network device.

Specifically, the relay terminal may receive the QoS information from a session management function SMF network element or a PCF network element.

Optionally, the QoS information includes first QoS information and/or second QoS information.

The first QoS information may be used to transmit data of a remote terminal between the remote terminal and the relay terminal.

The second QoS information may be used to transmit the data of the remote terminal between the relay terminal and a UPF network element.

For example, the first QoS information may include a QoS parameter from the remote terminal to the relay terminal, where the QoS parameter may be referred to as a PC5 QoS parameter. Specifically, the PC5 QoS parameter may include all or a part of parameters in a 5G QoS feature value applied to a PC5 interface, or include a 5QI corresponding to the 5G QoS feature value applied to the PC5 interface. For example, the PC5 QoS parameter may include a PC5 5QI (PQI) and a PC5 link aggregate maximum bit rate (PC5 link-AMBR for short).

For example, the second QoS information may include a QoS parameter from the relay terminal to the UPF network element, and may include all or a part of parameters in the 5G QoS feature value. Alternatively, the second QoS information may include a 5QI, an ARP, or a session aggregate maximum bit rate (session-AMBR for short).

Optionally, before step S201, the method further includes the following step:

The relay terminal receives relay communication indication information from the remote terminal.

Correspondingly, the relay terminal sends first identifier information of the remote terminal to the SMF network element based on the relay communication indication information. The first identifier information is used as an identifier of the remote terminal, and may be an ID or an IP address of the remote terminal.

The relay communication indication information may be used to indicate the remote terminal to perform relay communication.

Optionally, the relay terminal may send the first identifier information, for example, the ID or the IP address of the remote terminal, by using a PDU session establishment request message or a PDU session modification request message. After receiving the first identifier information, the SMF network element determines that current transmission is the relay transmission of the remote terminal. The SMF network element sends the first identifier information of the remote terminal to the PCF network element. The PCF network element may obtain, based on the first identifier information, related information bound to the first identifier information, where the related information may include a QoS parameter of the remote terminal in a relay transmission mode, and the like. Further, the PCF network element may generate the QoS information based on the related information, and then deliver the QoS information to the relay terminal.

In addition, the relay terminal may further send second identifier information of the remote terminal. The second identifier information is also used as an identifier of the remote terminal, and is used for distinguishing the second identifier information from the first identifier information. For example, the second identifier information may be the IP address of the remote terminal (in this case, the first identifier information may be the ID of the remote terminal), and the SMF network element sends the first identifier information and the second identifier information of the remote terminal to the PCF network element. Assuming that the first identifier information is the ID of the remote terminal and the second identifier information is the IP address of the remote terminal, the PCF network element may obtain, based on the ID and the IP address, related information bound to the ID and the IP address, for example, the QoS parameter of the remote terminal in the relay transmission mode. Further, the PCF network element may generate the QoS information based on the related information, and then deliver the QoS information to the relay terminal.

Specifically, the first identifier information may be the ID of the remote terminal, for example, a subscription permanent identifier (SUPI for short), a permanent equipment identifier (PEI for short), a 5G globally unique temporary identifier (5G-GUTI for short), or a generic public subscription identifier (GPSI for short).

S202: The relay terminal sends the first QoS information to the remote terminal based on the QoS information.

It should be noted that, because the QoS information obtained by the relay terminal in step S201 may include only the first QoS information, include only the second QoS information, or include both the first QoS information and the second QoS information, the following describes cases separately.

Case 1: When the QoS information obtained in step S201 includes only the second QoS information, the relay terminal may generate the first QoS information based on the second QoS information, and send the first QoS information to the remote terminal.

The relay terminal may generate the first QoS information based on the second QoS information in the following manners.

Manner 1: The second QoS information includes a 5QI, and the relay terminal determines a PQI in the first QoS information based on the 5QI. A correspondence between the 5QI and the PQI is preconfigured in the relay terminal, or is obtained by the relay terminal from a PCF by using a control plane during registration, or is obtained by the relay terminal from a ProSe function by using a data plane.

Manner 2: The second QoS information includes a session-AMBR, and the relay terminal determines a PC5 link-AMBR in the first QoS information based on the session-AMBR. A value of the PC5 link-AMBR may be the same as that of the session-AMBR.

Case 2: When the QoS information obtained in step S201 includes only the first QoS information, the second QoS information may be generated by a network side device (for example, the PCF network element or the SMF network element), and then sent to the relay terminal by the network side device, or may be generated by the relay terminal based on the first QoS information It should be noted that a manner in which the relay terminal generates the second QoS information based on the first QoS information is similar to a manner in which the relay terminal generates the first QoS information based on the second QoS information, and details are not described herein again.

In this embodiment of this application, because the first QoS information is used to transmit the data of the remote terminal, when the second QoS information exists, the second QoS information is also used to transmit the data of the remote terminal. The first QoS information and the second QoS information have a mutual mapping relationship in some QoS parameters. For example, there is a mapping relationship between the PQI and the 5QI, and the value of the PC5 link-AMBR is the same as that of the session-AMBR. Therefore, the first QoS information and the second QoS information also have a mutual association relationship. A service transmission requirement of relay transmission from the remote terminal to a network side is considered in terms of both a transmission rate and a transmission delay of the first QoS information and a transmission rate and a transmission delay of the second QoS information. Therefore, end-to-end QoS transmission assurance can be provided for the remote terminal. For example, from a delay perspective, when transmission is performed according to an exist mechanism, two delays, namely, a delay from the remote terminal to the relay terminal and a delay from the relay terminal to the network side, may be greater than a service delay requirement of the remote terminal. In this case, an end-to-end transmission delay may be controlled through cooperation between first QoS information and the second QoS information that are associated with each other in this application. From a rate perspective, if two rates, namely, a rate from the remote terminal to the relay terminal and a rate from the relay terminal to the network side, are different, a data packet loss occurs on the relay terminal. Therefore, in this application, a packet loss rate may be controlled by keeping a rate parameter of the first QoS information consistent with a rate parameter of the first QoS information. Therefore, a relay transmission requirement from the remote terminal to the UPF network element is fully satisfied.

Figure 3:
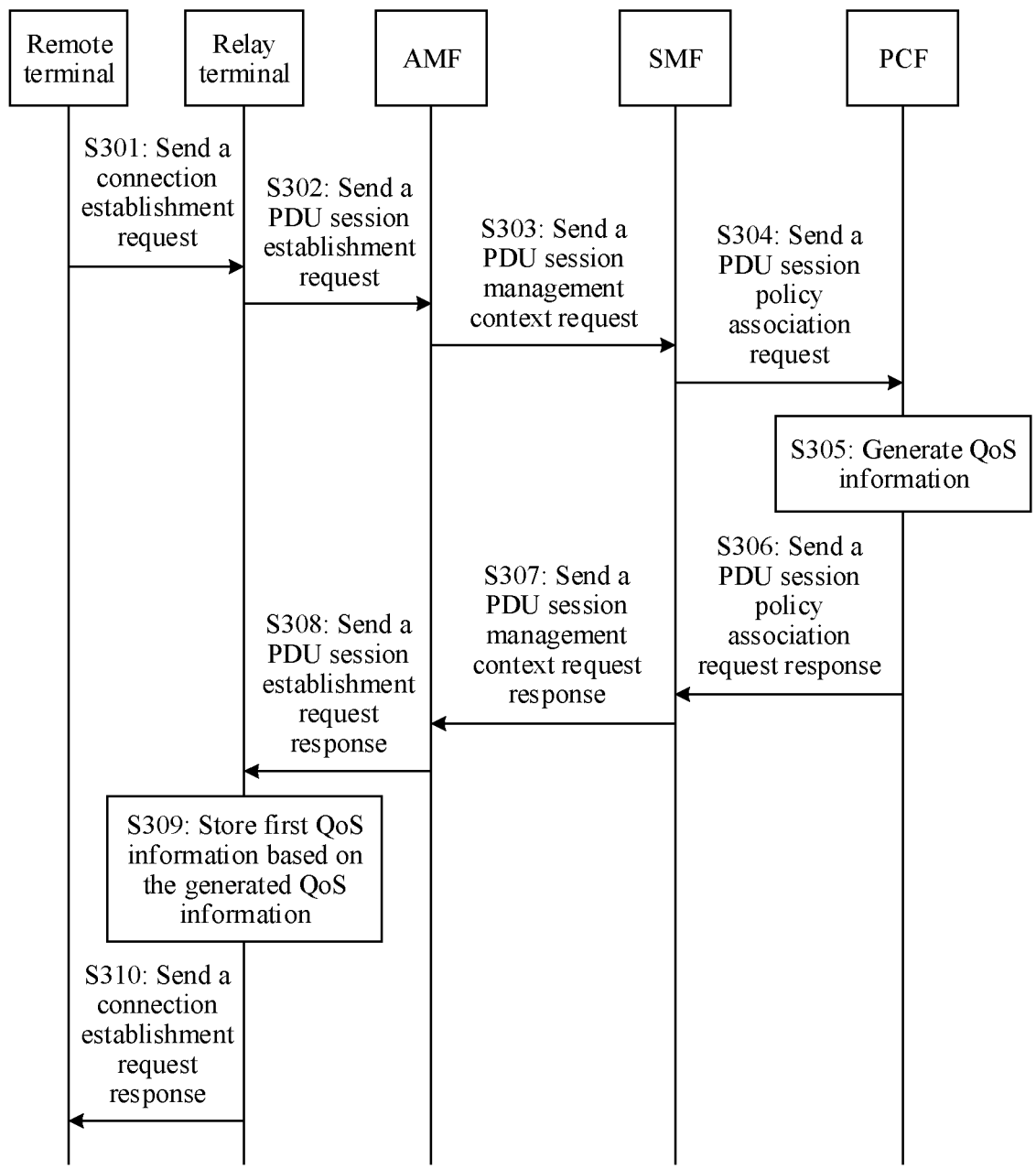
FIG. 3 is a schematic flowchart of another method for managing QoS according to an embodiment of this application.

FIG. 3 is a schematic flowchart of another method for managing QoS according to an embodiment of this application. The method may include the following steps.

S301: A remote terminal sends a connection establishment request to a relay terminal.

Optionally, when the remote terminal cannot directly connect to a network or quality of a signal between the remote terminal and the network is relatively poor, the remote terminal may initiate a relay discovery procedure. After the remote terminal discovers the relay terminal, the remote terminal sends the connection establishment request to the relay terminal, and establishes a relay transmission connection by using the relay terminal, to implement a communication connection to the network.

Optionally, the connection establishment request may include relay communication indication information and first identifier information of the remote terminal. The relay terminal may receive the relay communication indication information from the remote terminal by using the connection establishment request, where the relay communication indication information may be used to indicate the remote terminal to perform relay communication.

S302: The relay terminal sends a PDU session establishment request to an AMF network element.

Optionally, the relay terminal determines, based on whether an exist PDU session can satisfy a session requirement of the remote terminal, whether to establish a new PDU session. If the new PDU session needs to be established, the relay terminal sends a PDU session establishment request message. If the new PDU session does not need to be established, the relay terminal sends a PDU session modification request message.

Optionally, the PDU session is specially used to serve relay transmission.

The PDU session establishment request may include an identifier of the relay terminal and the first identifier information of the remote terminal. The first identifier information of the remote terminal is used to implicitly indicate that the PDU session serves the relay transmission of the remote terminal.

Optionally, the PDU session establishment request may further include the relay communication indication information. The relay communication indication information may be used to indicate that the PDU session serves the relay communication of the remote terminal, or used to indicate the remote terminal to perform relay communication.

It should be noted that message transmission may be performed between the relay terminal and the AMF network element by using a NAS message, and transparent transmission is performed by using a RAN device. Therefore, the RAN device is not shown in FIG. 3.

S303: The AMF network element sends a PDU session management context request to an SMF network element.

The PDU session management context request may include the identifier of the relay terminal and the first identifier information of the remote terminal. When receiving an identifier that is of a non-relay terminal and that is reported by the relay terminal, or receiving identifiers that are of two terminals and that are reported by the relay terminal, a device on a network side may learn that this transmission is relay transmission. Therefore, the first identifier information of the remote terminal may be used to implicitly indicate that the PDU session serves the relay transmission of the remote terminal.

Optionally, the PDU session management context request may further include the relay communication indication information. When receiving the relay communication indication information, the device on the network side may learn that this transmission is relay transmission. Therefore, the relay communication indication information may directly indicate that the PDU session serves the relay communication of the remote terminal.

S304: The SMF network element sends a PDU session policy association request to a PCF network element.

The session policy association request may also carry the first identifier information of the remote terminal or the relay communication indication information.

The PCF network element is a PCF network element that can provide QoS parameter authorization for both communication between the relay terminal and a UPF network element and PC5 communication between the relay terminal and the remote terminal. Specifically, the SMF network element may select, before step S304, the PCF network element based on a capability of the PCF network element.

In addition, the SMF network element may further allocate an IP address to the remote terminal, and include the IP address in the PDU session policy association request, so that the PCF network element determines an association relationship between the first identifier information of the remote terminal and the IP address.

S305: The PCF network element generates QoS information.

The QoS information may include first QoS information and/or second QoS information. The first QoS information is used to transmit data of the remote terminal between the remote terminal and the relay terminal, and the second QoS information is used to transmit the data of the remote terminal between the relay terminal and the user plane function UPF network element.

Specifically, in step S305, the PCF network element may determine, based on the first identifier information of the remote terminal or based on the first identifier information of the remote terminal and the relay communication indication information, that the remote terminal is in a relay transmission communication mode, and further determine policy information (policy info) of the remote terminal in the relay transmission communication mode.

policy info may be a policy and charging control (PCC for short) rule. policy info may include only the first QoS information that is used to transmit the data of the remote terminal between the remote terminal and the relay terminal, and may include an authorized QoS parameter corresponding to PC5 communication between the remote terminal and the relay terminal. Alternatively, policy info may include only the second QoS information that is used to transmit the data of the remote terminal between the relay terminal and the user plane function UPF network element, and may include an authorized QoS parameter corresponding to communication between the relay terminal and the UPF network element. Alternatively, policy info may include both the first QoS information and the second QoS information.

Optionally, the PCF may obtain subscription information of the remote terminal from a UDR, where the subscription information of the remote terminal includes QoS subscription information of the remote terminal in the relay transmission communication mode.

Optionally, in a first implementation of step S304, the PCF network element may generate the first QoS information and/or the second QoS information based on the QoS subscription information of the remote terminal. The QoS subscription information of the remote terminal may be QoS subscription information of the remote terminal in the relay transmission mode, or may be QoS subscription information of the remote terminal in a direct communication mode. In the direct communication mode, the remote terminal directly communicates with a network.

Specifically, the QoS subscription information may include a 5QI, an ARP, and a session-AMBR that correspond to each data network name (DNN for short)/single network slice selection assistance information (S-NSSAI for short), and a PQI and a PC5 link-AMBR that correspond to PC5 communication. Correspondingly, the DNN and the S-NSSAI are further included in S302, S303, and S304. The PCF network element may generate the first QoS information based on a DNN and S-NSSAI of the PDU session, and a subscribed 5QI, an ARP, and a session-AMBR that correspond to the DNN/the S-NSSAI. The PCF network element may generate the second QoS information based on a subscribed PQI and a PC5 link-AMBR that correspond to PC5 communication.

Optionally, the PCF may further obtain identifier information of the relay terminal during information exchange (corresponding to including the identifier information of the relay terminal in steps S302, S303, and S304). In this case, the PCF network element may generate the first QoS information and/or the second QoS information based on the QoS subscription information of the remote terminal and QoS subscription information of the relay terminal. The QoS subscription information of the remote terminal may be QoS subscription information of the remote terminal in a relay transmission mode, or may be QoS subscription information of the remote terminal in a direct communication mode.

Specifically, the QoS subscription information of the relay terminal includes a UE-AMBR. That a value of the UE-AMBR of the relay terminal affects the PC5 link-AMBR in the first QoS information and/or the session-AMBR in the second QoS information may be understood as: The PC5 link-AMBR in the first QoS information and/or the session-AMBR in the second QoS information should not exceed the UE-AMBR of the relay terminal. The PCF determines the PC5 link-AMBR in the first QoS information and/or the session-AMBR in the second QoS information based on a session-AMBR of the remote terminal, the PC5 link-AMBR, and the UE-AMBR of the relay terminal.

Optionally, in the first implementation of step S304, the PCF network element generates the first QoS information and/or the second QoS information based on the subscription information and service information of the remote terminal and a service requirement.

Specifically, the PCF network element may obtain the service information (for example, which may include but is not limited to a service type such as a voice service, a data service, and a video service) of the remote terminal and the service requirement (for example, a delay requirement and a rate requirement) during information exchange (for example, carrying the service information in steps S301, S302, S303, and S304).

For example, the QoS subscription information of the remote terminal includes the subscribed 5QI corresponding to the DNN/the S-NSSAI and the subscribed PQI corresponding to the PC5 communication, and the service requirement may be a specific transmission delay requirement. The PCF determines the PQI in the first QoS information and/or the 5QI in the second QoS information based on a data packet delay budget value in the 5QI and/or the PQI and the service transmission delay requirement.

For another example, the QoS subscription information of the remote terminal includes a subscribed GBR (which is understood as a maximum aggregate bit rate of all GBR QoS flows), and the service requirement may be a specific transmission rate requirement. The PCF determines, based on the subscribed GBR and the service transmission rate requirement, a GFBR that corresponds to a service and that is in the first QoS information and/or a GFBR that corresponds to the service and that is in the second QoS information. Further, the PCF determines, based on the subscribed GBR, a GFBR corresponding to an existing GBR QoS flow, and the service transmission rate requirement, the GFBR that corresponds to the service and that is in the first QoS information and/or the GFBR that corresponds to the service and that is in the second QoS information, to ensure that a sum of GFBRs of all GBR QoS flows is less than the subscribed GBR.

Optionally, in the third implementation of step S305, the PCF network element generates the first QoS information and/or the second QoS information based on the subscription information and service information of the remote terminal and subscription information of the relay terminal.

Specifically, the PCF may obtain the subscription information of the relay terminal and the service information of the remote terminal. The PCF network element generates the first QoS information and/or the second QoS information based on the subscription information and the service information of the remote terminal and the subscription information of the relay terminal.

For example, the QoS subscription information of the remote terminal includes the subscribed 5QI corresponding to the DNN/the S-NSSAI and the subscribed PQI corresponding to the PC5 communication. The QoS subscription information of the relay terminal includes the subscribed 5QI corresponding to the DNN/the S-NSSAI and the subscribed PQI corresponding to the PC5 communication. The service requirement may be a specific transmission delay requirement. The PCF determines the PQI in the first QoS information and/or the 5QI in the second QoS information based on the data packet delay budget value in the 5QI and/or the PQI and the service transmission delay requirement. The determined PQI and/or the 5QI need to be consistent with the subscribed PQI corresponding to the PC5 communication and the subscribed 5QI corresponding to the DNN/the S-NSSAI included in the QoS subscription information of the relay terminal.

For another example, the QoS subscription information of the remote terminal includes a subscribed GBR, the QoS subscription information of the relay terminal also includes a subscribed GBR, and the service requirement may be a specific transmission rate requirement. The PCF determines, based on the subscribed GBR of the remote terminal, the subscribed GBR of the relay terminal, and the service transmission rate requirement, the GFBR that corresponds to the service and that is in the first QoS information and/or the GFBR that corresponds to the service and that is in the second QoS information. The determined GFBRs need to be less than both the subscribed GBR in the QoS subscription information of the remote terminal and the subscribed GBR in the QoS subscription information of the relay terminal.

S306: The PCF network element sends a PDU session policy association request response to the SMF network element.

The PDU session policy association request response carries the QoS information.

S307: The SMF network element sends a PDU session context request response to the AMF network element.

The PDU session context request response carries the QoS information.

S308: The AMF network element sends a PDU session establishment request response to the relay terminal.

The PDU session establishment request response carries the QoS information. The QoS information may include the first QoS information and/or the second QoS information.

It should be noted that when the QoS information includes only the first QoS information, the second QoS information may be separately sent by a network side device (for example, the SMF network element or the PCF network element) to the relay terminal, or may be generated by the relay terminal or the remote terminal. When the QoS information includes only the second QoS information, the relay terminal may generate the first QoS information based on the second QoS information, and send the first QoS information to the remote terminal.

S309: The relay terminal stores the first QoS information based on the generated QoS information.

Optionally, when the QoS information received by the relay terminal includes the first QoS information, the first QoS information is directly stored. When the QoS information received by the relay terminal does not include the first QoS information, the relay terminal generates the first QoS information based on the second QoS information and stores the first QoS information.

S310: The relay terminal sends a connection establishment request response to the remote terminal.

The connection establishment request response carries the first QoS information.

In the foregoing procedure, the remote terminal can obtain the QoS information that satisfies the service transmission requirement of the remote terminal, and the second QoS information used in service transmission between the relay terminal and the UPF network element on the network side is associated with the first QoS information, so that QoS guarantee of the end-to-end service transmission from the remote terminal to the UPF network element can be ensured.

Optionally, after step S306, the SMF network element may further generate first QoS flow information based on the first QoS information, and generate second QoS flow information based on the second QoS information. The first QoS flow information is used to carry the data of the remote terminal transmitted between the remote terminal and the relay terminal, and the second QoS flow information is used to carry the data of the remote terminal transmitted between the relay terminal and the user plane function UPF network element. Optionally, the first QoS flow information may include a QFI, a GFBR, an MFBR, and a flow rule (QoS rule). The second QoS flow information may include a PFI, the GFBR, the MFBR, and the flow rule.

Specifically, the SMF network element determines, based on the first QoS information, whether there is an existing QoS flow that corresponds to the first QoS information, to determine whether the PQI in the first QoS information is the same as a PQI in the existing QoS flow. If the PQI in the first QoS information is the same as the PQI in the existing QoS flow, the first QoS information is associated with the existing QoS flow, information (for example, a GFBR or an MFBR) about the QoS flow is updated, and the first QoS flow information is generated. If the PQI in the first QoS information is different from the PQI in the existing QoS flow, a new QoS flow is established, and the first QoS flow information is generated. Generating the second QoS flow information based on the second QoS information is similar to what is described above, and details are not described herein again.

The SMF network element may deliver the generated QoS flow information to the relay terminal.

Optionally, in step S305, the PCF may alternatively generate overall QoS information used for transmitting the data of the remote terminal between the remote terminal and the UPF network element. In this case, the SMF network element may generate the first QoS flow information and/or the second QoS flow information based on the QoS information.

Delivering the QoS flow information is similar to delivering the QoS information, the delivered QoS flow information may also include the first QoS flow information and/or the second QoS flow information. When the QoS flow information includes only the first QoS flow information, the second QoS flow information may be separately sent to the relay terminal by a network side device such as the SMF network element or the PCF network element, or may be generated by the relay terminal or the remote terminal. When the QoS flow information includes only the second QoS flow information, the relay terminal may generate the first QoS flow information based on the second QoS flow information, and send the first QoS flow information to the remote terminal.

Optionally, the relay terminal may generate the first QoS flow information based on the second QoS flow information in the following manners:

Manner 1: The second QoS flow information includes a QFI, and the relay terminal determines a PFI in the first QoS flow information based on the QFI in the second QoS flow information. For example, a value of the QFI may be the same as a value of the PFI. For example, both the value of the QFI and the value of the PFI may be 50. Alternatively, the value of the QFI and the value of the PFI may be different, but there is a mapping relationship between the value of the QFI and the value of the PFI. The mapping relationship may be stored by the relay terminal.

Manner 2: The second QoS flow information includes a GFBR, and the relay terminal determines a GFBR in the first QoS flow information based on the GFBR in the second QoS flow information. A value of the GFBR in the first QoS flow information is the same as a value of the GFBR in the second QoS flow information. For example, both the value of the GFBR in the first QoS flow information and the value of the GFBR in the second QoS flow information are 10 Mb/s.

Manner 3: The second QoS flow information includes an MFBR, and the relay terminal determines an MFBR in the first QoS flow information based on the MFBR in the second QoS flow information. For example, a value of the MFBR in the first QoS flow information is the same as a value of the MFBR in the second QoS flow information. For example, both the value of the MFBR in the first QoS flow information and the value of the MFBR in the second QoS flow information are 20 Mb/s.

Manner 4: The second QoS flow information includes a flow rule, and the relay terminal determines a flow rule in the first QoS flow information based on the flow rule in the second QoS flow information. The flow rule shows a mapping relationship between an IP address and a flow identifier, a mapping relationship between a port number and a flow identifier, or a mapping relationship among an IP address, a port number, and a flow identifier. For example, the flow rule in the first QoS flow information is the same as the flow rule in the second QoS flow information. The flow rules of the first QoS flow information and the second QoS flow information both include an IP of the remote terminal, a same port number such as a port 2, and flow identifiers having the same value, for example, a QFI and a PFI that are both 50.

It should be noted that when the second QoS flow information includes a plurality of parameters (for example, various combinations of the QFI, the MFBR, and the GFBR), a manner in which the relay terminal generates the first QoS flow information based on the second QoS flow information may include a manner corresponding to the plurality of parameters. This is not limited.

The relay terminal may further store the first QoS flow information, and deliver the first QoS flow information to the remote terminal.

The foregoing is a specific implementation of the PDU session establishment process in this embodiment of this application. For an existing PDU session, existing QoS information may be managed by using a PDU session modification procedure.

In this case, the connection establishment request in step S301 is changed to a connection modification request, the PDU session establishment request in step S302 is changed to a PDU session modification request, and the PDU session policy association request in step S304 is changed to a PDU session policy association modification request. Optionally, the two request messages in steps S302 and S303 may include identifier information related to the PDU session (for example, the PDU session modification request includes a PDU session ID, and the PDU session policy association modification request includes an SM policy association ID). In this case, because after the PDU session is established, the SMF and the PCF know the first identifier information that corresponds to the PDU session ID/SM policy association ID and that is of the remote terminal and the identifier information of the relay terminal, the first identifier information of the remote terminal may not be carried, and the identifier information of the relay terminal may not be carried, either. Other steps are basically the same as those described in S305 to S310, and details are not described herein again.

In this implementation of this embodiment, the network side may determine the two pieces of associated QoS information, namely, the QoS information from the remote terminal to the relay terminal and the QoS information from the relay terminal to the UPF network element, to provide great QoS management and a service transmission assurance for an end-to-end service of the remote terminal.

Figure 4:
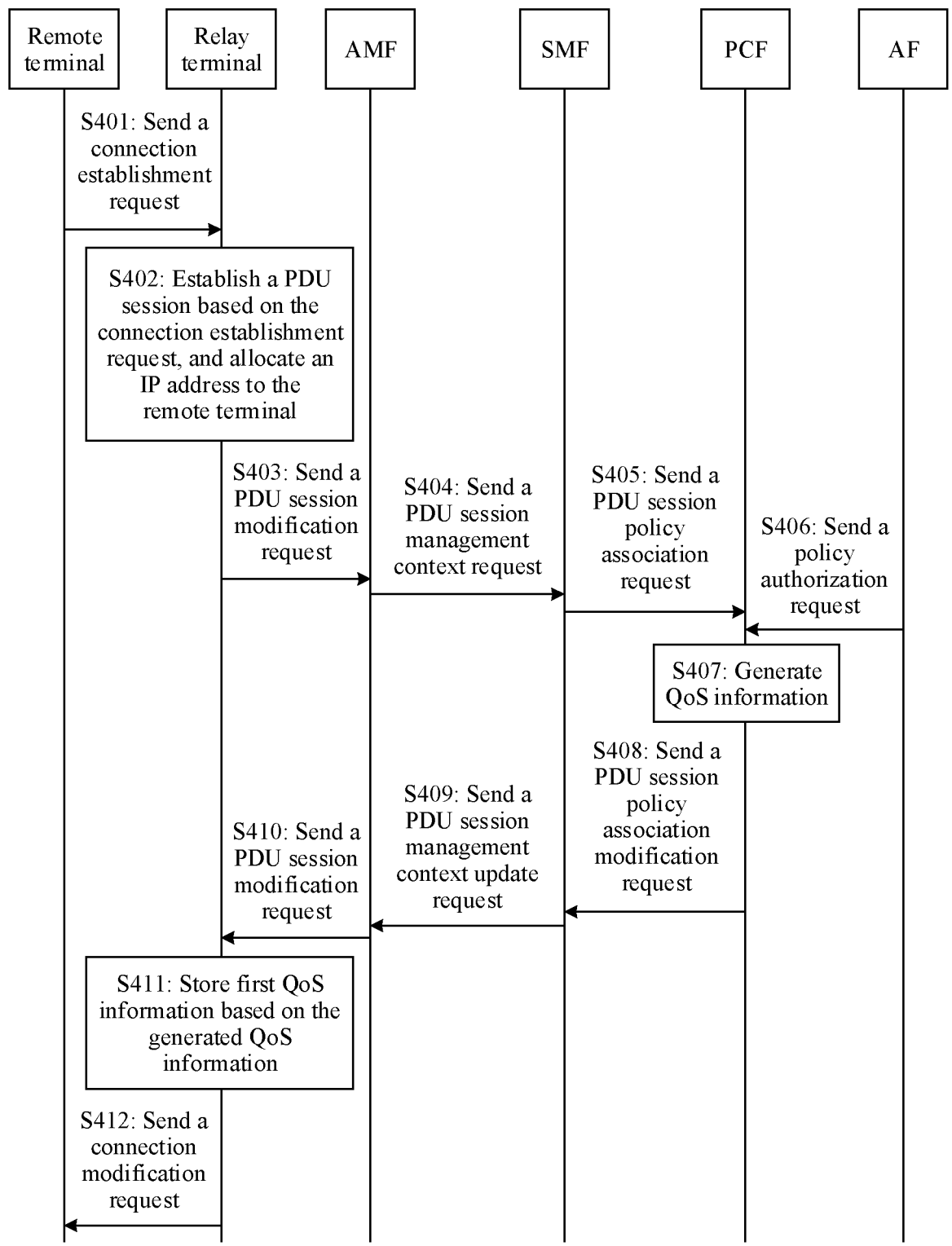
FIG. 4 is a schematic flowchart of still another method for managing QoS according to an embodiment of this application.

FIG. 4 is a schematic flowchart of still another method for managing QoS according to an embodiment of this application. In this embodiment of this application, an application function AF network element may trigger, based on a service requested by a remote terminal, a PCF network element to generate corresponding QoS information. Optionally, an IP address of the remote terminal may be allocated by a relay terminal to the remote terminal, or may be allocated by an SMF network element to the remote terminal. An example in which the relay terminal allocates the IP address to the remote terminal is used below for description.

S401: The remote terminal sends a connection establishment request to the relay terminal.

S402: The relay terminal establishes a PDU session based on the connection establishment request, and allocates an IP address to the remote terminal.

When establishing the PDU session, the relay terminal may determine the SMF network element and a PCF network element that serve the PDU session. In addition, the relay terminal may obtain, from the SMF network element, an IP address allocated to the relay terminal, and allocate the IP address to the remote terminal. Optionally, the relay terminal determines an IP address of the remote terminal based on the IP address allocated by the SMF network element.

S403: The relay terminal sends a PDU session modification request to an AMF network element.

The PDU session modification request carries second identifier information of the remote terminal. The second identifier information includes the IP address of the remote terminal, and may further include an ID of the remote terminal. For related descriptions of the ID, refer to the descriptions described before step S202 in FIG. 2.

For example, when the relay terminal allocates the IP address to the remote terminal in S403, the relay terminal initiates a PDU session modification procedure, and reports the second identifier information of the remote terminal.

S404: The AMF network element sends a PDU session management context request to the SMF network element.

The PDU session management context request carries the second identifier information of the remote terminal.

The second identifier information may be used as an identifier of the remote terminal, and is different from first identifier information. For example, the second identifier information may be the IP address of the remote terminal, and in this case, the first identifier information may be the ID of the remote terminal.

S405: The SMF network element sends a PDU session policy association request to the PCF network element.

The PDU session policy association request may be used to request, from the PCF network element, a QoS policy corresponding to the PDU session.

The PDU session policy association request carries the second identifier information of the remote terminal.

For example, after obtaining the IP address that is of the remote terminal and that is in the second identifier information, the PCF network element may request a binding support function (BSF for short) network element to bind a mapping relationship between the PCF network element and the IP address of the remote terminal. The PCF may also record that the remote terminal is currently in a relay transmission state.

It should be noted that the request messages in steps S403, S404, and S405 are mainly used to report the IP address of the remote terminal. Each request message has a corresponding response message. For example, a "PDU session modification request response" corresponds to the PDU session modification request in S403, a "PDU session management context request response" corresponds to the PDU session management context request in S404, and a "PDU session policy association request response" corresponds to the PDU session policy association request in S405. These response messages may be used to provide a feedback to the device that sends the request message, to notify the device that sends the request message that the request message and the IP address carried in the request message have been received.

In addition, after step S402, there is also a "connection establishment request response" corresponding to the connection establishment request in S401. As a part of information exchanged between the remote terminal and the PCF network element, the response message is mainly used to acknowledge and reply to the corresponding request message, and is not closely associated with triggering the PCF network element to generate QoS information. Therefore, the response message is not shown in FIG. 4.

S406: An AF network element sends a policy authorization request to the PCF network element.

The AF network element may obtain the IP address of the remote terminal, which may be specifically implemented by using the remote terminal and an application server by using an application layer. The AF obtains, from a BSF network element, the PCF network element corresponding to the IP address of the remote terminal. The AF network element sends the policy authorization request to the corresponding PCF based on a service requested by the remote terminal, to trigger the PCF network element to generate the corresponding QoS information.

S407: The PCF network element generates the QoS information.

S408: The PCF network element sends a PDU session policy association modification request to the SMF network element.

The PDU session policy association modification request may carry the generated QoS information.

S409: The SMF network element sends a PDU session context update request to the AMF network element.

The PDU session context update request may carry the generated QoS information.

S410: The AMF network element sends a PDU session modification request to the relay terminal.

The PDU session modification request may carry the generated QoS information.

S411: The relay terminal stores first QoS information based on the generated QoS information.

For example, when the QoS information received by the relay terminal includes the first QoS information, the first QoS information is directly stored. When the QoS information received by the relay terminal does not include the first QoS information, the relay terminal generates the first QoS information based on second QoS information and stores the first QoS information.

S412: The relay terminal sends a connection modification request to the remote terminal.

The connection modification request may carry the first QoS information.

It should be noted that the various request messages in steps S406, S408 to S410, and S412 also have corresponding response messages, which are specifically described below.

After step S411, the relay terminal may return a response message corresponding to the PDU session modification request in step S410 to the AMF network element, the AMF network element returns a response message for the PDU session context update request in step S409 to the SMF network element, the SMF network element returns a response message for the PDU session policy association modification request in step S408 to the PCF network element, and the PCF network element returns a response message for the policy authorization request in step S406 to the AF network element.

Optionally, the remote terminal returns a response message for the connection modification request in step S412 to the relay terminal, and then the relay terminal returns the response message for the PDU session modification request in step S410.

Optionally, the PCF network element may alternatively return the response message for the policy authorization request in step S406 to the AF network element after step S407.

For a manner of generating the QoS information in steps S407 to S412 and information and content carried in each step, refer to the descriptions of corresponding steps S305 to S310 in the embodiment shown in FIG. 3. Details are not described herein again.

Optionally, in addition to a manner in which the relay terminal allocates the IP address to the remote terminal in step S402, refer to the descriptions described after step S304 in FIG. 3. The SMF network element may allocate the IP address to the remote terminal, and include the second identifier information of the remote terminal in the PDU session policy association request subsequently sent to the PCF.

In addition, for generation and transmission of QoS flow information, also refer to the related descriptions in the embodiment shown in FIG. 3. Details are not described herein again.

In this embodiment of this application, the AF network element requests a network side to generate the corresponding QoS information for the remote terminal, to ensure QoS assurance of end-to-end transmission of the remote terminal.

It should be noted that, in addition to a manner in which the network side delivers the QoS information to the remote terminal, the QoS information may alternatively be obtained in a manner in which the remote terminal or the relay terminal actively requests authorization. For example, the relay terminal may send requested QoS information (the requested QoS information may be replaced with QoS information that requests for authorization) to the PCF network element. The requested QoS information may include third QoS information that requests for authorization and that is used to transmit data of the remote terminal between the remote terminal and the relay terminal (refer to the related descriptions of the first QoS information, and details are not described herein again) and/or fourth QoS information that requests for authorization and that is used to transmit the data of the remote terminal between the relay terminal and a user plane function UPF network element (refer to the related descriptions of the second QoS information, and details are not described herein again). Then, the relay terminal receives, from the PCF network element, authorization information of the requested QoS information. The relay terminal delivers the authorization information of the requested QoS information to the remote terminal.

For the requested QoS information, the relay terminal may generate the requested QoS information. Alternatively, the relay terminal receives the requested QoS information from the remote terminal. Alternatively, the relay terminal receives the third QoS information from the remote terminal, and generates the fourth QoS information based on the third QoS information. For details, refer to descriptions in FIG. 5 to FIG. 7.

Figure 5:
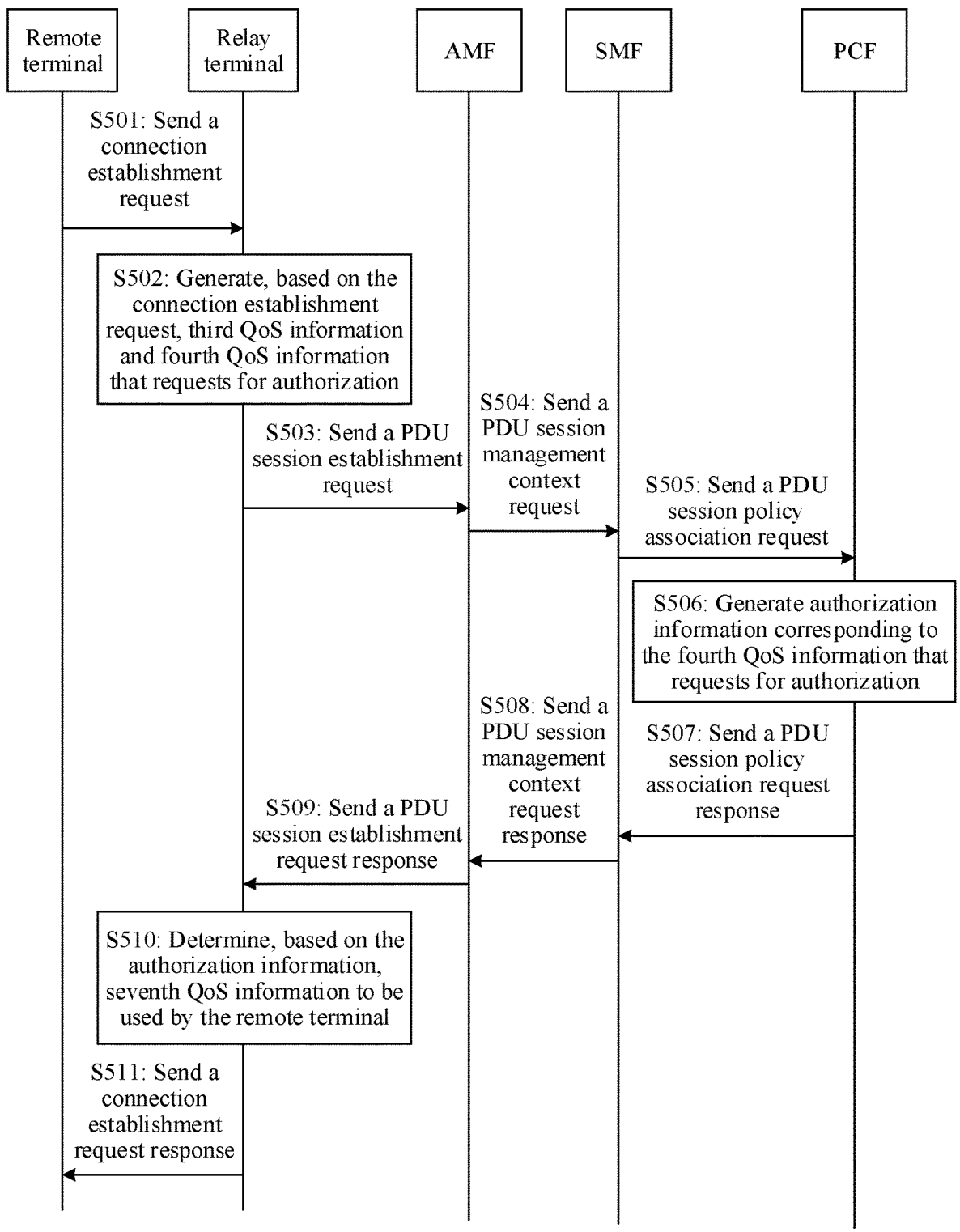
FIG. 5 is a schematic flowchart of still another method for managing QoS according to an embodiment of this application.

FIG. 5 is a schematic flowchart of still another method for managing QoS according to an embodiment of this application. In this embodiment, the following steps may be included.

S501: A remote terminal sends a connection establishment request to a relay terminal.

The connection establishment request includes service information of the remote terminal, and the service information may include a service type, a service transmission rate, a delay requirement, or the like. Alternatively, the connection establishment request may include relay communication indication information, and the relay communication indication information may be used to indicate the remote terminal to initiate relay transmission.

S502: The relay terminal generates, based on the connection establishment request, third QoS information and fourth QoS information that requests for authorization.

Optionally, the relay terminal determines, based on the relay communication indication information in the connection establishment request, that the remote terminal initiates relay transmission. Alternatively, the relay terminal determines, based on the service information that is of the remote terminal and that is included in the connection establishment request, the third QoS information and the fourth QoS information that requests for authorization.

The fourth QoS information that requests for authorization may be used to transmit data of the remote terminal between the relay terminal and a UPF network element.

The third QoS information is used to transmit the data of the remote terminal between the remote terminal and the relay terminal. Specifically, the relay terminal may obtain, from a PCF network element during registration, a PC5 QoS parameter corresponding to the service information, and then generate the third QoS information with reference to the service information requested by the remote terminal.

For example, the fourth QoS information that requests for authorization may be determined by the relay terminal based on the third QoS information. For example, the third QoS information includes a PQI, and the relay terminal determines a 5QI in the fourth QoS information based on the PQI. A correspondence between the 5QI and the PQI is preconfigured in the relay terminal, or is obtained by the relay terminal from a PCF by using a control plane during registration, or is obtained by the relay terminal from a ProSe function by using a data plane. The third QoS information includes a PC5 link-AMBR, and the relay terminal may determine a session-AMBR in the fourth QoS information based on the PC5 link-AMBR. A value of the session-AMBR may be the same as that of the PC5 link-AMBR.

S503: The relay terminal sends a PDU session modification request to an AMF.

The PDU session modification request carries the fourth QoS information that requests for authorization.

S504: The AMF network element sends a PDU session management context request to an SMF network element.

The PDU session management context request may include the fourth QoS information that requests for authorization, an identifier of the relay terminal, and first identifier information of the remote terminal. The first identifier information of the remote terminal is used to implicitly indicate that the PDU session serves the relay transmission of the remote terminal.

Optionally, the PDU session management context request includes the relay communication indication information, and the relay communication indication information may be used to indicate that the PDU session serves the relay transmission of the remote terminal.

S505: The SMF network element sends a PDU session policy association request to the PCF network element.

The PDU session policy association request carries the fourth QoS information that requests for authorization.

S506: The PCF network element generates authorization information corresponding to the fourth QoS information that requests for authorization.

In an example, the authorization information is used to indicate that the fourth QoS information that requests for authorization has been authorized. For example, the authorization information may be an acknowledgment indication used to notify the relay terminal that the fourth QoS information that requests for authorization has been authorized and may be used.

In another example, the authorization information includes authorized QoS information, and the authorized QoS information may be the same as or different from the fourth QoS information that requests for authorization. For example, the PCF network element may determine one piece of second QoS information in the manner in the embodiment shown in FIG. 3, to transmit the data of the remote terminal between the relay terminal and the UPF network element. Then, the second QoS information is compared with the fourth QoS information to obtain authorized QoS information suitable for use by the relay terminal, and the authorized QoS information is delivered.

Optionally, step S506 specifically includes"

The PCF network element sends the authorization information to the relay terminal based on subscription information of the remote terminal and the fourth QoS information that requests for authorization;

the PCF network element sends the authorization information to the relay terminal based on subscription information of the remote terminal, subscription information of the relay terminal, and the requested QoS information;

the PCF network element sends the authorization information to the relay terminal based on subscription information and service information of the remote terminal and the requested QoS information; or the PCF network element sends the authorization information to the relay terminal based on subscription information and service information of the remote terminal, subscription information of the relay terminal, and the requested QoS information.

S507: The PCF network element sends a PDU session policy association request response to the SMF network element.

The PDU session policy association request response carries the authorization information.

S508: The SMF network element sends a PDU session context request response to the AMF network element.

The PDU session context request response carries the authorization information.

S509: The AMF network element sends a PDU session establishment request response to the relay terminal.

The PDU session establishment request response carries the authorization information.

S510: The relay terminal determines, based on the authorization information, seventh QoS information used by the remote terminal.

Optionally, after receiving the authorization information, the relay terminal may determine, based on an authorization indication included in the authorization information or authorized sixth QoS information included in the authorization information, whether the third QoS information in step S502 needs to be modified. If the third QoS information does not need to be modified, the relay terminal sends the third QoS information to the remote terminal as the seventh QoS information used by the remote terminal. If the third QoS information needs to be modified, for example, a limited transmission rate in the sixth QoS information is less than a transmission rate in the third QoS information, the relay terminal may update the third QoS information, and then send the seventh QoS information obtained after the update to the remote terminal.

It should be noted that the relay terminal generates the third QoS information based on the PC5 QoS parameter obtained from the network side PCF network element in advance. When generating the authorized sixth QoS information, the PCF network element may perform overall consideration with reference to the PC5 QoS parameter of the relay terminal. In this case, the generated third QoS information does not need to be modified by default. Therefore, step S510 may be skipped. Step S511 is directly performed.

S511: The relay terminal sends a connection establishment request response to the remote terminal.

The connection establishment request response carries the seventh QoS information used by the remote terminal.

Optionally, before step S509, the SMF network element may also associate a QoS flow with QoS information (for example, update an original QoS flow and associate the QoS flow with the QoS information, or generate a new QoS flow and associate the new QoS flow with the QoS information) based on a QoS management requirement, and deliver corresponding QoS flow information. For details, refer to the descriptions of the embodiment shown in FIG. 3. Details are not described herein again.

In this embodiment, the relay terminal generates the third QoS information and the fourth QoS information that requests for authorization, requests authorization from the network side, and finally obtains the authorized QoS information, so that QoS assurance of an end-to-end service of the remote terminal is implemented.

Figure 6:
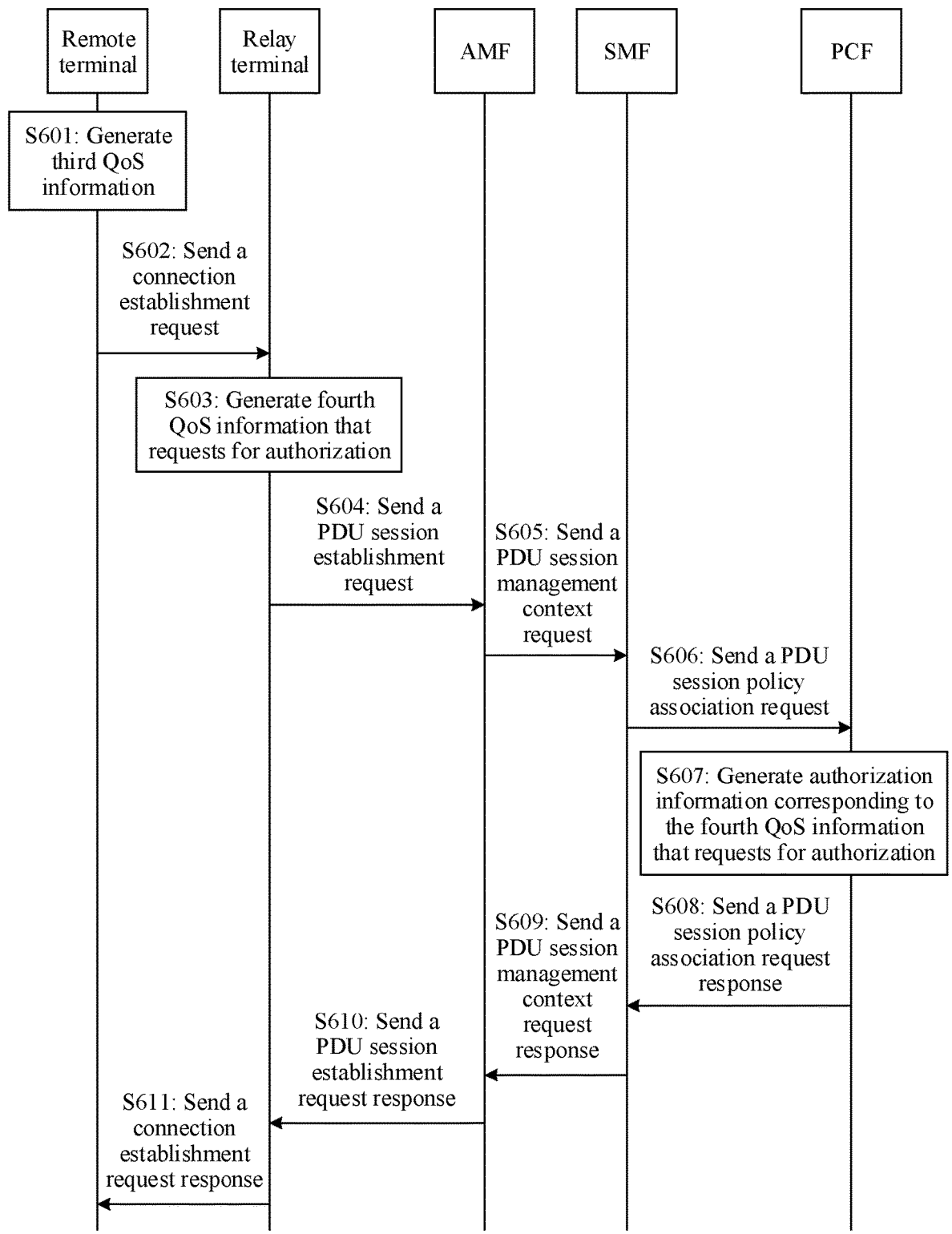
FIG. 6 is a schematic flowchart of still another method for managing QoS according to an embodiment of this application.

FIG. 6 is a schematic flowchart of still another method for managing QoS according to an embodiment of this application. In this embodiment, the following steps may be included.

S601: A remote terminal generates third QoS information.

Optionally, during registration, the remote terminal obtains, from a PCF network element, an authorized PC5 QoS parameter corresponding to service information, and then determines the third QoS information based on the requested service information. For details, refer to step S501.

The third QoS information may be used to transmit data of the remote terminal between the remote terminal and a relay terminal.

S602: The remote terminal sends a connection establishment request to the relay terminal.

The connection setup establishment message includes the third QoS information.

S603: The relay terminal generates fourth QoS information that requests for authorization.

Optionally, the relay terminal may determine, based on relay communication indication information in the connection establishment request, that the remote terminal initiates relay transmission, and may further generate, based on the third QoS information included in the connection establishment request, the fourth QoS information that requests for authorization.

The fourth QoS information may be used to transmit the data of the remote terminal between the relay terminal and a UPF network element. Refer to the descriptions of step S502 in FIG. 5. The fourth QoS information may be generated based on the third QoS information. For example, there may be a mapping relationship between the third QoS information and the fourth QoS information. The mapping relationship may be preconfigured in the relay terminal, or the relay terminal may obtain the mapping relationship from the PCF network element during registration.

Optionally, if the connection establishment request further includes the service information requested by the remote terminal, the relay terminal may alternatively generate the fourth QoS information based on the service information and the PC5 QoS parameter.

Optionally, the relay terminal performs, based on information (for example, the PC5 QoS parameter and/or the service information) obtained by the relay terminal, availability assessment on the third QoS information generated by the remote terminal. For example, when a PC5 link-AMBR in the third QoS information of the remote terminal is greater than a PC5 link-AMBR that can be supported by the relay terminal, the relay terminal sends information about the PC5 link-AMBR supported by the relay terminal to the remote terminal.

Steps S604 to S610 and S611 are basically similar to steps S503 to S509 and S511 shown in FIG. 5, and details are not described herein again.

Optionally, before step S609, the SMF network element may also associate a QoS flow with QoS information based on a QoS management requirement, and deliver corresponding QoS flow information. For details, refer to the descriptions of the embodiment shown in FIG. 3. Details are not described herein again.

In this embodiment, the remote terminal generates the third QoS information, and the relay terminal generates the fourth QoS information that requests for authorization, requests authorization from the network side, and finally obtains the authorized QoS information, so that QoS assurance of an end-to-end service of the remote terminal is implemented.

Figure 7:
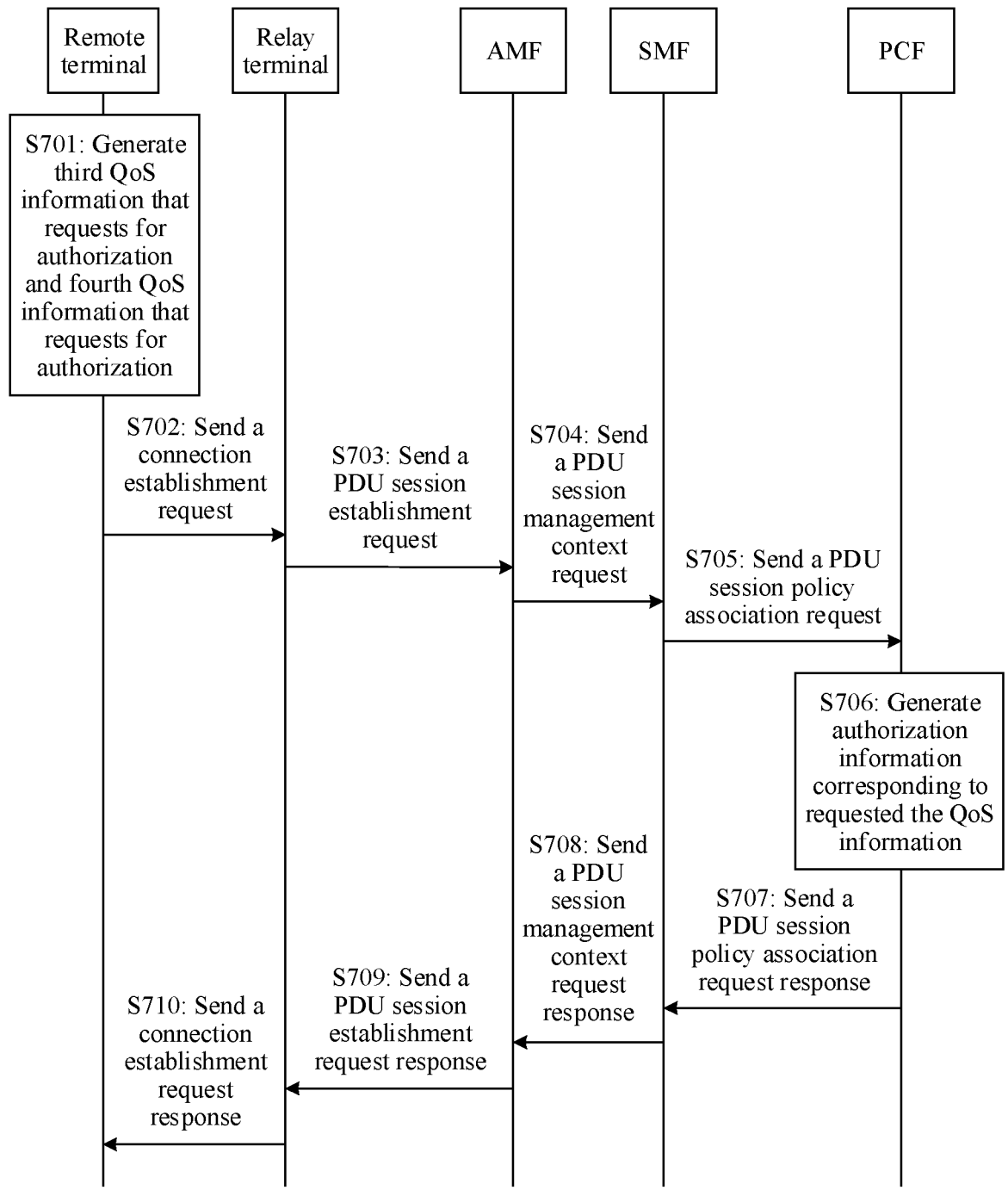
FIG. 7 is a schematic flowchart of still another method for managing QoS according to an embodiment of this application.

FIG. 7 is a schematic flowchart of still another method for managing QoS according to an embodiment of this application. In this embodiment, the following steps may be included.

S701: A remote terminal generates third QoS information that requests for authorization and fourth QoS information that requests for authorization.

Optionally, during registration, the remote terminal may obtain an authorized PC5 QoS parameter from a PCF network element, and may generate, with reference to requested service information, the third QoS information that requests for authorization and the fourth QoS information that requests for authorization.

The third QoS information that requests for authorization is used to transmit data of the remote terminal between the remote terminal and a relay terminal. The fourth QoS information that requests for authorization is used to transmit the data of the remote terminal between the relay terminal and a UPF network element.

S702: The remote terminal sends a connection establishment request to the relay terminal.

Steps S703 to S710 are basically similar to steps S604 to S611 shown in FIG. 6, and details are not described herein again.

It should be noted that, although the procedures are basically similar, during message exchange, reported information needs to carry the third QoS information that requests for authorization and the fourth QoS information that requests for authorization, and the PCF network element may also deliver corresponding authorization information for the two pieces of requested QoS information. For example, the authorization information includes two authorization indications, or includes two pieces of authorized QoS information. The two pieces of authorized QoS information may include authorized fifth QoS information that is used to transmit the data of the remote terminal between the remote terminal and the relay terminal (refer to the related descriptions of the first QoS information, and details are not described herein again) and authorized sixth QoS information that is used to transmit the data of the remote terminal between the relay terminal and the UPF network element (refer to the related descriptions of the second QoS information, and details are not described herein again).

Optionally, if only the authorized sixth QoS information is delivered, the relay terminal may further determine the fifth QoS information based on the sixth QoS information, and send the fifth QoS information to the remote terminal.

Optionally, before step S707, the SMF network element may also associate a QoS flow with QoS information based on a QoS management requirement, and deliver corresponding QoS flow information. For details, refer to the descriptions of the embodiment shown in FIG. 3. Details are not described herein again.

In this embodiment, the remote terminal generates the third QoS information that requests for authorization and the fourth QoS information that requests for authorization, and then the relay terminal requests authorization from the network side, and finally obtains the authorized QoS information, so that QoS assurance of an end-to-end service of the remote terminal is implemented.

Certainly, in addition to the foregoing implementation, refer to the embodiment shown in FIG. 3 or FIG. 4, the network side may first determine the second QoS information, and then the relay terminal determines, based on the PC5 QoS parameter and/or the service information of the remote terminal, the third QoS information that requests for authorization, requests authorization from the PCF network element, obtains the authorized third QoS information, and delivers the third QoS information to the remote terminal for use. This is not limited in this embodiment of this application.

Figure 8:
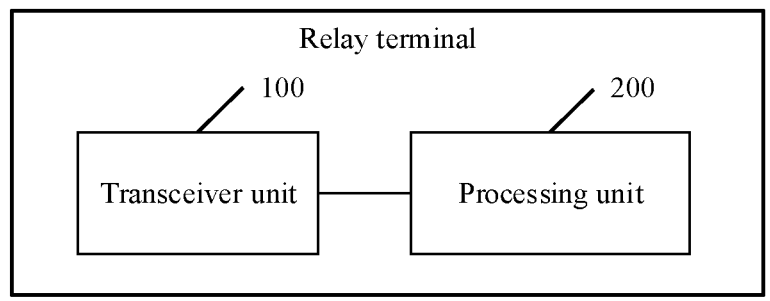
FIG. 8 is a schematic composition diagram of a relay terminal according to an embodiment of this application.

FIG. 8 is a schematic composition diagram of a relay terminal according to an embodiment of this application. The relay terminal may include a transceiver unit 100 and a processing unit 200.

In an example of obtaining QoS information, the transceiver unit 100 is configured to obtain QoS information from a network device, where the QoS information includes first QoS information and/or second QoS information, the first QoS information is used to transmit data of a remote terminal between the remote terminal and the relay terminal, and the second QoS information is used to transmit the data of the remote terminal between the relay terminal and a user plane function UPF network element; and the processing unit 200 is configured to send the first QoS information to the remote terminal based on the QoS information.

Optionally, the QoS information includes the second QoS information and does not include the first QoS information, and the processing unit 200 is specifically configured to:

determine the first QoS information based on the second QoS information, and send the first QoS information to the remote terminal.

Optionally, the transceiver unit 100 is specifically configured to:

receive the QoS information from a session management function SMF network element or a PCF network element.

Optionally, the transceiver unit 100 is further configured to:

receive relay communication indication information from the remote terminal, where the relay communication indication information is used to indicate the remote terminal to perform relay communication; and the processing unit 200 is further configured to send first identifier information of the remote terminal to the SMF network element based on the relay communication indication information.

Optionally, the processing unit 200 is further configured to:

indicate the transceiver unit 100 to send second identifier information of the remote terminal to the SMF network element.

Optionally, the relay terminal further includes:

a storage unit 300, configured to store the QoS information.

Optionally, the transceiver unit 100 is further configured to:

obtain QoS flow information; and the processing unit 200 is further configured to send information about a first QoS flow to the remote terminal based on the QoS flow information, where the first QoS flow is used to carry the data of the remote terminal transmitted between the remote terminal and the relay terminal, where the QoS flow information includes the information about the first QoS flow and/or information about a second QoS flow, and the second QoS flow is used to carry the data of the remote terminal transmitted between the relay terminal and the user plane function UPF network element.

Optionally, the QoS flow information includes the information about the second QoS flow and does not include the information about the first QoS flow, and the processing unit 200 is specifically configured to:

determine the information about the first QoS flow based on the information about the second QoS flow, and send the information about the first QoS flow to the remote terminal.

Optionally, the storage unit 300 is further configured to: store the QoS flow information.

In another example of obtaining QoS information, the relay terminal may obtain authorization information of the QoS information by requesting authorization from a PCF network element, to further obtain the QoS information. In this case, the processing unit 200 may be configured to indicate the transceiver unit 100 to send requested QoS information to a policy control function PCF network element, where the requested QoS information includes third QoS information that requests for authorization and/or fourth QoS information that requests for authorization, the third QoS information is used to transmit data of a remote terminal between the remote terminal and the relay terminal, and the fourth QoS information is used to transmit the data of the remote terminal between the relay terminal and a user plane function UPF network element; and the transceiver unit 100 is configured to receive authorization information that is of the requested QoS information and that is from the PCF network element.

Optionally, the processing unit 200 is further configured to:

generate the requested QoS information;

the transceiver unit 100 is further configured to receive the requested QoS information from the remote terminal; or the transceiver unit 100 is further configured to receive the third QoS information from the remote terminal, and the processing unit is further configured to generate the fourth QoS information based on the third QoS information.

Optionally, the authorization information is used to indicate that the requested QoS information has been authorized, or the authorization information includes authorized QoS information, where the authorized QoS information includes authorized fifth QoS information and/or authorized sixth QoS information, the fifth QoS information is used to transmit the data of the remote terminal between the remote terminal and the relay terminal, and the sixth QoS information is used to transmit the data of the remote terminal between the relay terminal and the UPF network element.

Optionally, the authorized QoS information includes the sixth QoS information and does not include the fifth QoS information, and the processing unit is further configured to:

determine the fifth QoS information based on the sixth QoS information, and send the fifth QoS information to the remote terminal.

For concepts, explanations, detailed descriptions, and other steps of the relay terminal that are related to the technical solutions provided in this embodiment of this application, refer to the descriptions of the content in the foregoing method embodiments. Details are not described herein again.

Figure 9:
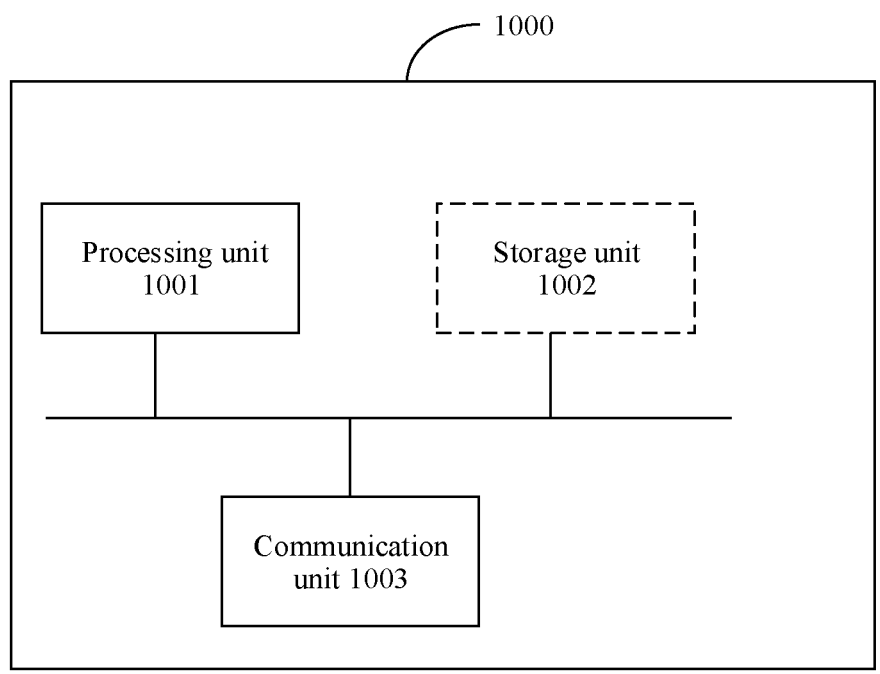
FIG. 9 is a schematic composition diagram of a communication apparatus according to an embodiment of this application.

FIG. 9 is a schematic composition diagram of a communication apparatus according to an embodiment of this application. The communication apparatus 1000 may be the relay terminal in embodiments of this application, or a chip or a system-on-a-chip in the relay terminal. Specifically, the communication apparatus 1000 may include a processing unit 1001, a storage unit 1002, and a communication unit 1003. The communication unit 1003 may include an antenna and a transceiver of the relay terminal.

In an example, the communication apparatus 1000 may be the chip in the relay terminal in embodiments of this application, and the communication unit 1003 may be an input or output interface, a pin, a circuit, or the like. Optionally, the storage unit 1002 is configured to store computer-executable instructions related to the method performed on a relay terminal side, so that the processing unit 1001 performs the method on the relay terminal side in the foregoing embodiments. The storage unit 1002 may be a register, a cache, a RAM, or the like, and the storage unit 1002 may be integrated with the processing unit 1001. The storage unit 1002 may be a ROM or another type of static storage device that can store static information and instructions, and the storage unit 1002 may be independent of the processing unit 1001. Optionally, with development of wireless communication technologies, the transceiver may be integrated into the communication apparatus 1000. For example, the transceiver and a network interface are integrated into the communication unit 1003.

When the communication apparatus 1000 is the relay terminal in embodiments of this application or the chip in the relay terminal, the method performed by the relay terminal in the foregoing embodiments can be implemented.

In an example of obtaining the QoS information, the communication unit 1003 may obtain QoS information from a network device, and the processing unit 1001 may indicate, based on the QoS information, the communication unit 1003 to send first QoS information to a remote terminal. When the communication unit 1003 receives only second QoS information, the processing unit 1001 may generate the first QoS information based on the second QoS information. The communication unit 1003 may receive relay communication indication information from the remote terminal, and the processing unit 1001 may send first identifier information of the remote terminal to an SMF network element based on the relay communication indication information received by the communication unit 1003. The processing unit 1001 may further indicate the communication unit 1003 to send second identifier information of the remote terminal to the SMF network element. The communication unit 1003 may further obtain QoS flow information, and the processing unit 1001 may further send first QoS flow information to the remote terminal based on the QoS flow information.

In another example of obtaining QoS information, the relay terminal may obtain authorization information of the QoS information by requesting authorization from a PCF network element, to further obtain the QoS information. In this case, the processing unit 1001 may be configured to indicate the communication unit 1003 to send requested QoS information to a policy control function PCF network element, and the communication unit 1003 may further be configured to receive authorization information that is of the requested QoS information and that is from the PCF network element. For specific information exchange and an information processing process, refer to related content in FIG. 2 to FIG. 7.

The storage unit 1002 may store the QoS information and the QoS flow information.

It should be noted that for concepts, explanations, detailed descriptions, and other steps of the communication apparatus 1000 that are related to the technical solutions provided in this embodiment of this application, refer to the descriptions of the content in the foregoing method embodiments or other embodiments. Details are not described herein again.

Figure 10:
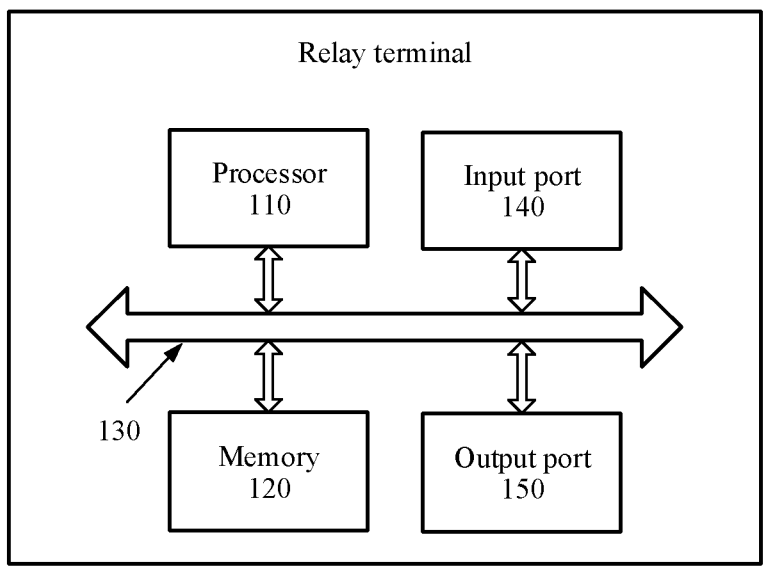
FIG. 10 is a schematic composition diagram of another relay terminal according to an embodiment of this application.

FIG. 10 is a schematic composition diagram of another relay terminal according to an embodiment of this application.

The relay terminal may include a processor 110, a memory 120, and a bus 130. The processor 110 is connected to the memory 120 through the bus 130. The memory 120 is configured to store instructions. The processor 110 is configured to execute the instructions stored in the memory 120, to implement the steps performed by the relay terminal in the methods corresponding to FIG. 2 to FIG. 7.

Further, the relay terminal may further include an input port 140 and an output port 150. The processor 110, the memory 120, the input port 140, and the output port 150 may be connected through the bus 130.

The processor 110 is configured to execute the instructions stored in the memory 120, to complete the steps performed by the relay terminal in the foregoing methods. The input port 140 and the output port 150 may be a same physical entity or different physical entities. When the input port 140 and the output port 150 are a same physical entity, the input port 140 and the output port 150 may be collectively referred to as an input/output port. The memory 120 may be integrated into the processor 110, or may be disposed separately from the processor 110.

In an implementation, functions of the input port 140 and the output port 150 may be implemented by using a transceiver circuit or a dedicated transceiver chip. The processor 110 may be implemented by using a dedicated processing chip, a processing circuit, a processor, or a general-purpose chip.

In another implementation, the relay terminal provided in this embodiment of this application may be implemented in a form of a general-purpose computer. To be specific, program code used to implement functions of the processor 110, the input port 140, and the output port 150 is stored in the memory, and a general-purpose processor executes the code in the memory, to implement the functions of the processor 110, the input port 140, and the output port 150.

For concepts, explanations, detailed descriptions, and other steps of the relay terminal that are related to the technical solutions provided in this embodiment of this application, refer to the descriptions of the content in the foregoing method embodiments or other embodiments. Details are not described herein again.

Figure 11:
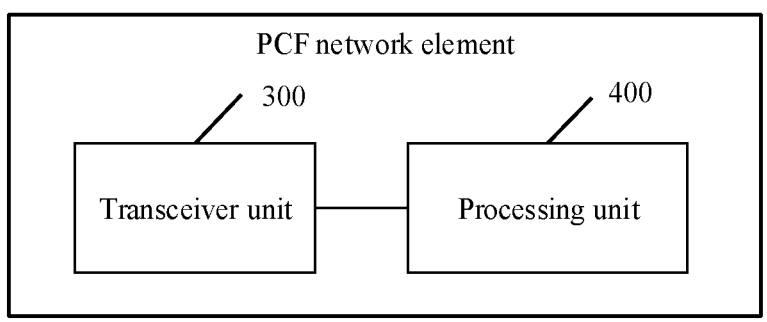
FIG. 11 is a schematic composition diagram of a PCF network element according to an embodiment of this application.

FIG. 11 is a schematic composition diagram of a PCF network element according to an embodiment of this application. The PCF network element may include a transceiver unit 300 and a processing unit 400.

In an example of obtaining QoS information, the transceiver unit 300 is configured to receive a first message from an SMF network element or an AF network element, where the first message includes identifier information of a remote terminal; and the processing unit 400 is configured to send QoS information to a relay terminal of the remote terminal based on the first message, where the QoS information includes first QoS information and/or second QoS information, the first QoS information is used to transmit data of the remote terminal between the remote terminal and the relay terminal, and the second QoS information is used to transmit the data of the remote terminal between the relay terminal and a UPF network element.

Optionally, the processing unit 400 is specifically configured to:

obtain the QoS information based on the first message, and send the QoS information to the relay terminal;

when the first message further includes identifier information of the relay terminal or relay communication indication information, obtain the QoS information based on the first message, and send the QoS information to the relay terminal, where the relay communication indication information is used to indicate the remote terminal to perform relay communication; or when the identifier information of the remote terminal is an IP address of the remote terminal, and determining, based on the identifier information of the remote terminal, that the remote terminal performs relay communication, obtain the QoS information based on the first message, and send the QoS information to the relay terminal.

Optionally, the processing unit 400 is specifically configured to:

obtain subscription information of the remote terminal based on the first message; and obtain the QoS information based on the subscription information of the remote terminal.

Optionally, when the first message further includes the identifier information of the relay terminal, the processing unit 400 is specifically configured to:

obtain the QoS information based on the subscription information of the remote terminal and subscription information of the relay terminal;

when the first message further includes service information of the remote terminal, obtain the QoS information based on the subscription information and the service information of the remote terminal; or when the first message further includes the identifier information of the relay terminal and service information of the remote terminal, obtain the QoS information based on the subscription information and the service information of the remote terminal and subscription information of the relay terminal.

In another example of obtaining QoS information, the relay terminal may obtain authorization information of the QoS information by requesting authorization from a PCF network element, to further obtain the QoS information. In this case, the transceiver unit 300 in the PCF network element may be configured to receive requested QoS information from a relay terminal, where the requested QoS information includes third QoS information that requests for authorization and/or fourth QoS information that requests for authorization, the third QoS information is used to transmit data of a remote terminal between the remote terminal and the relay terminal, and the fourth QoS information is used to transmit the data of the remote terminal between the relay terminal and a UPF network element; and the processing unit 400 is configured to send authorization information of the requested QoS information to the relay terminal based on the requested QoS information.

It should be noted that the requested QoS information mentioned in this application may also be referred to as authorized QoS information. Details are not described again.

Optionally, the processing unit 400 is specifically configured to:

send the authorization information to the relay terminal based on subscription information of the remote terminal and the requested QoS information;

send the authorization information to the relay terminal based on subscription information of the remote terminal, subscription information of the relay terminal, and the requested QoS information;

send the authorization information to the relay terminal based on subscription information and service information of the remote terminal and the requested QoS information; or send the authorization information to the relay terminal based on subscription information and service information of the remote terminal, subscription information of the relay terminal, and the requested QoS information.

Optionally, the authorization information is used to indicate that the requested QoS information has been authorized, or the authorization information includes authorized QoS information, where the authorized QoS information includes authorized fifth QoS information and/or authorized sixth QoS information, the fifth QoS information is used to transmit the data of the remote terminal between the remote terminal and the relay terminal, and the sixth QoS information is used to transmit the data of the remote terminal between the relay terminal and the user plane function UPF network element.

For concepts, explanations, detailed descriptions, and other steps of the PCF network element that are related to the technical solutions provided in this embodiment of this application, refer to the descriptions of the content in the foregoing method embodiments or other embodiments. Details are not described herein again.

Figure 12:
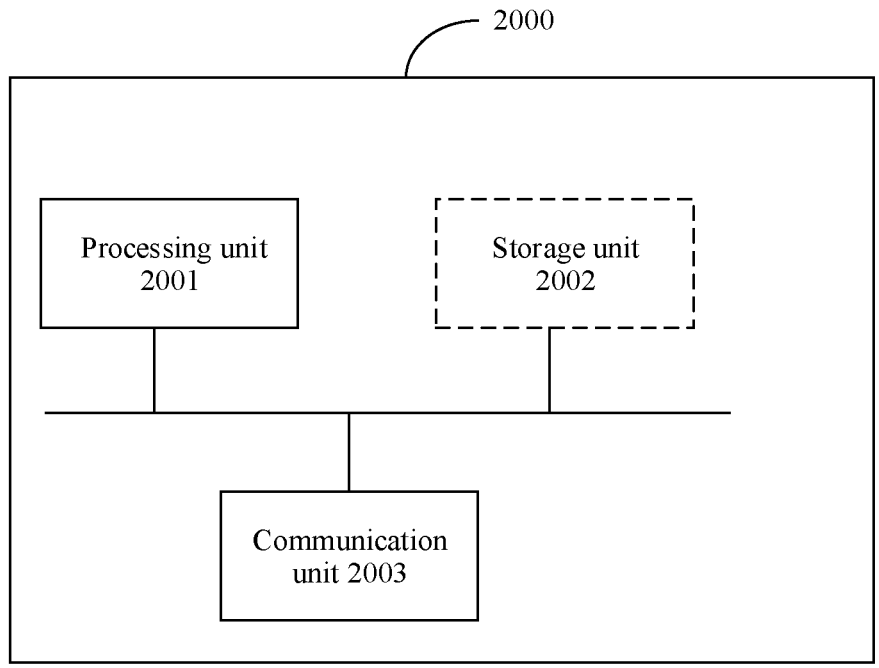
FIG. 12 is a schematic composition diagram of a communication apparatus according to an embodiment of this application.

FIG. 12 is a schematic composition diagram of a communication apparatus according to an embodiment of this application. The communication apparatus 2000 may be the PCF network element in embodiments of this application, or a chip or a system-on-a-chip in the PCF network element. The communication apparatus 2000 may include a processing unit 2001, a storage unit 2002, and a communication unit 2003.

Optionally, the communication unit 2003 in the communication apparatus 2000 includes a transceiver of the PCF, and may also be referred to as a communication interface. Specifically, the communication unit 2003 may be an input or output interface, a pin, a circuit, or the like. Optionally, the storage unit 2002 is configured to store computer-executable instructions related to the method performed on a PCF network element side, so that the processing unit 2001 performs the method on the PCF network element side in the foregoing embodiments. The storage unit 2002 may be a register, a cache, a RAM, or the like, and the storage unit 2002 may be integrated with the processing unit 2001. The storage unit 2002 may be a ROM or another type of static storage device that can store static information and instructions, and the storage unit 2002 may be independent of the processing unit 2001. Optionally, with development of wireless communication technologies, the transceiver may be integrated into the communication apparatus 2000. For example, the transceiver and a network interface are integrated into the communication unit 2003.

When the communication apparatus 2000 is the PCF network element in embodiments of this application or the chip in the PCF network element, the method performed by the PCF network element in the foregoing embodiments can be implemented.

In an example of obtaining QoS information, the communication unit 2003 may receive a first message from an SMF network element or an AF network element, where the first message includes identifier information of a remote terminal. The processing unit 2001 may obtain the QoS information based on the first message, and send the QoS information to the remote terminal by using the communication unit 2003. For specific information exchange and a process of obtaining the QoS information, refer to related content in FIG. 2 to FIG. 7.

In another example of obtaining QoS information, the relay terminal may obtain authorization information of the QoS information by requesting authorization from a PCF network element, to further obtain the QoS information. In this case, the processing unit 2001 may send, by using the communication unit 2003, authorization information of the requested QoS information to the relay terminal based on the QoS information requested by the relay terminal. For specific information exchange and a process of obtaining the authorization information, refer to related content in FIG. 2 to FIG. 7.

The storage unit 2002 may store the QoS information and the authorization information.

For concepts, explanations, detailed descriptions, and other steps of the communication apparatus 2000 that are related to the technical solutions provided in this embodiment of this application, refer to the descriptions of the content in the foregoing method embodiments or other embodiments. Details are not described herein again.

Figure 13:
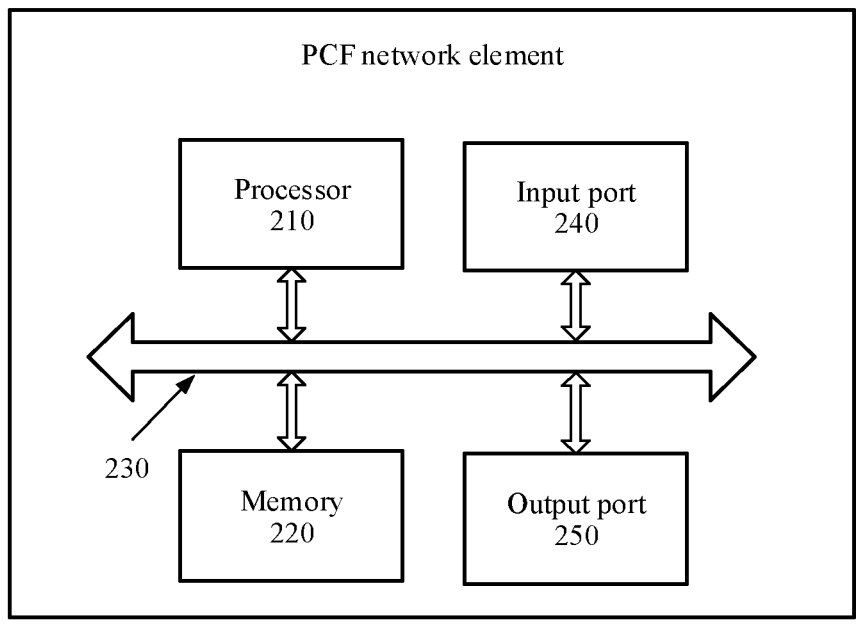
FIG. 13 is a schematic composition diagram of another PCF network element according to an embodiment of this application.

FIG. 13 is a schematic composition diagram of another PCF network element according to an embodiment of this application. The PCF network element may include a processor 210, a memory 220, and a bus 230. The processor 210 is connected to the memory 220 through the bus 230. The memory 220 is configured to store instructions. The processor 210 is configured to execute the instructions stored in the memory 220, to implement the steps performed by the PCF network element in the methods corresponding to FIG. 2 to FIG. 7.

Further, the PCF network element may further include an input port 240 and an output port 250. The processor 210, the memory 220, the input port 240, and the output port 250 may be connected through the bus 230.

The processor 210 is configured to execute the instructions stored in the memory 220, to control the input port 240 to receive a signal and control the output port 250 to send a signal, so as to complete the steps performed by the PCF network element in the foregoing methods. The input port 240 and the output port 250 may be a same physical entity or different physical entities. When the input port 240 and the output port 250 are a same physical entity, the input port 240 and the output port 250 may be collectively referred to as an input/output port. The memory 220 may be integrated into the processor 210, or may be disposed separately from the processor 210.

In an implementation, functions of the input port 240 and the output port 250 may be implemented by using a transceiver circuit or a dedicated transceiver chip. The processor 210 may be implemented by using a dedicated processing chip, a processing circuit, a processor, or a general-purpose chip.

In another implementation, the PCF network element provided in this embodiment of this application may be implemented in a form of a general-purpose computer. To be specific, program code used to implement functions of the processor 210, the input port 240, and the output port 250 is stored in the memory, and a general-purpose processor executes the code in the memory, to implement the functions of the processor 210, the input port 240, and the output port 250.

For concepts, explanations, detailed descriptions, and other steps of the PCF network element that are related to the technical solutions provided in this embodiment of this application, refer to the descriptions of the content in the foregoing method embodiments or other embodiments. Details are not described herein again.

Figure 14:
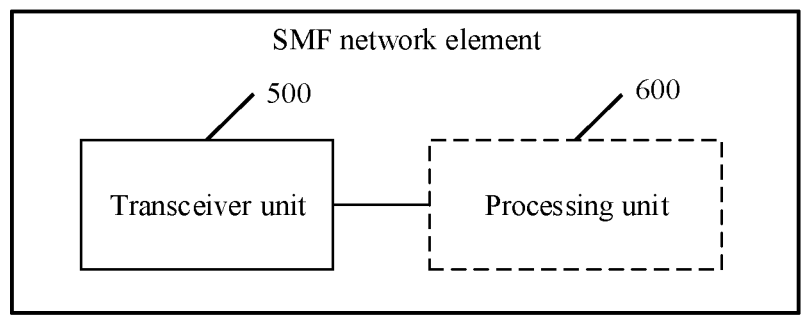
FIG. 14 is a schematic composition diagram of an SMF network element according to an embodiment of this application.

FIG. 14 is a schematic composition diagram of an SMF network element according to an embodiment of this application. The SMF network element may include a transceiver unit 500.

The transceiver unit 500 is configured to receive QoS information from a policy control function PCF network element, where the QoS information includes first QoS information and/or second QoS information, the first QoS information is used to transmit data of a remote terminal between the remote terminal and a relay terminal, and the second QoS information is used to transmit the data of the remote terminal between the relay terminal and a user plane function UPF network element; and send the QoS information to the relay terminal.

Optionally, the SMF network element further includes a processing unit 600.

The processing unit 600 is configured to generate QoS flow information based on the QoS information, and send the QoS flow information to the relay terminal.

Optionally, the QoS flow information includes information about a first QoS flow and/or information about a second QoS flow, the first QoS flow is used to carry the data of the remote terminal transmitted between the remote terminal and the relay terminal, the second QoS flow is used to carry the data of the remote terminal transmitted between the relay terminal and the user plane function UPF network element, and the information about the second QoS flow corresponds to the second QoS information.

Optionally, the information about the first QoS flow includes flow rule information and flow identifier information of the first QoS flow.

Optionally, the information about the second QoS flow includes flow rule information and flow identifier information of the second QoS flow.

For concepts, explanations, detailed descriptions, and other steps of the SMF network element that are related to the technical solutions provided in this embodiment of this application, refer to the descriptions of the content in the foregoing method embodiments or other embodiments. Details are not described herein again.

Figure 15:
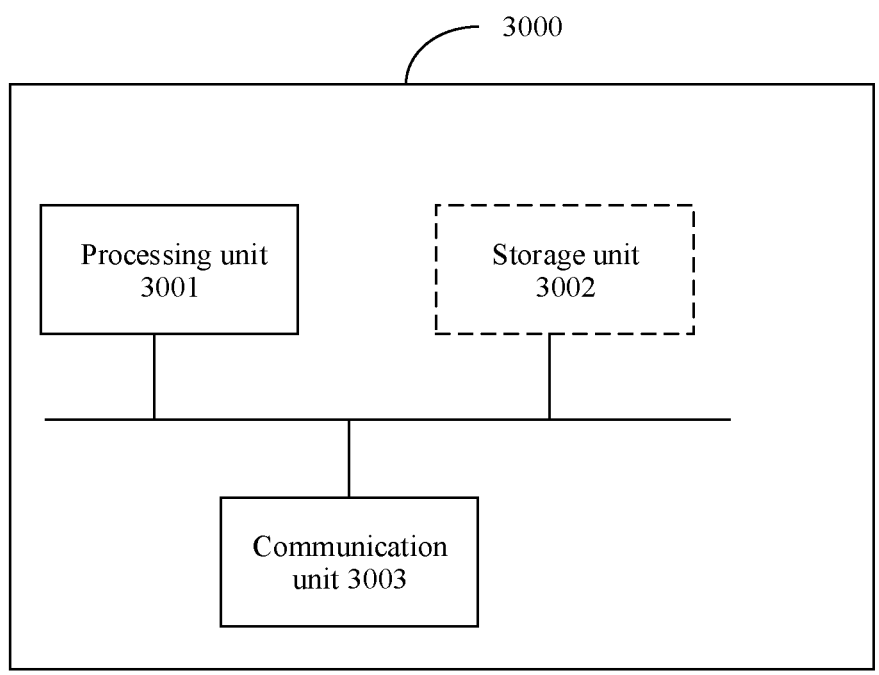
FIG. 15 is a schematic composition diagram of a communication apparatus according to an embodiment of this application

FIG. 15 is a schematic composition diagram of a communication apparatus according to an embodiment of this application. The communication apparatus 3000 may be the SMF network element in embodiments of this application, or a chip or a system-on-a-chip in the SMF network element. The communication apparatus 3000 may include a processing unit 3001, a storage unit 3002, and a communication unit 3003.

Optionally, the communication unit 3003 may include a transceiver of the SMF.

The communication apparatus 3000 may be the chip in the SMF network element in embodiments of this application, and the communication unit 3003 may be an input or output interface, a pin, a circuit, or the like. Optionally, the storage unit 3002 may store computer-executable instructions related to the method performed on an SMF network element side, so that the processing unit 3001 performs the method on the SMF network element side in the foregoing embodiments. The storage unit 3002 may be a register, a cache, a RAM, or the like, and the storage unit 3002 may be integrated with the processing unit 3001. The storage unit 3002 may be a ROM or another type of static storage device that can store static information and instructions, and the storage unit 3002 may be independent of the processing unit 3001. Optionally, with development of wireless communication technologies, the transceiver may be integrated into the communication apparatus 3000. For example, the transceiver and a network interface are integrated into the communication unit 3003.

When the communication apparatus 3000 is the SMF network element in embodiments of this application or the chip in the SMF network element, the method performed by the SMF network element in the foregoing embodiments can be implemented.

The communication unit 3003 may receive QoS information from a PCF network element, and send the QoS information to a relay terminal. The processing unit 3001 may generate QoS flow information based on the QoS information, and send the QoS flow information to the relay terminal by using the communication unit 3003. For specific information exchange and a process of generating the QoS flow information, refer to related content in FIG. 2 to FIG. 7.

The storage unit 3002 may store the QoS information and the QoS flow information.

For concepts, explanations, detailed descriptions, and other steps of the communication apparatus 3000 that are related to the technical solutions provided in this embodiment of this application, refer to the descriptions of the content in the foregoing method embodiments or other embodiments. Details are not described herein again.

Figure 16:
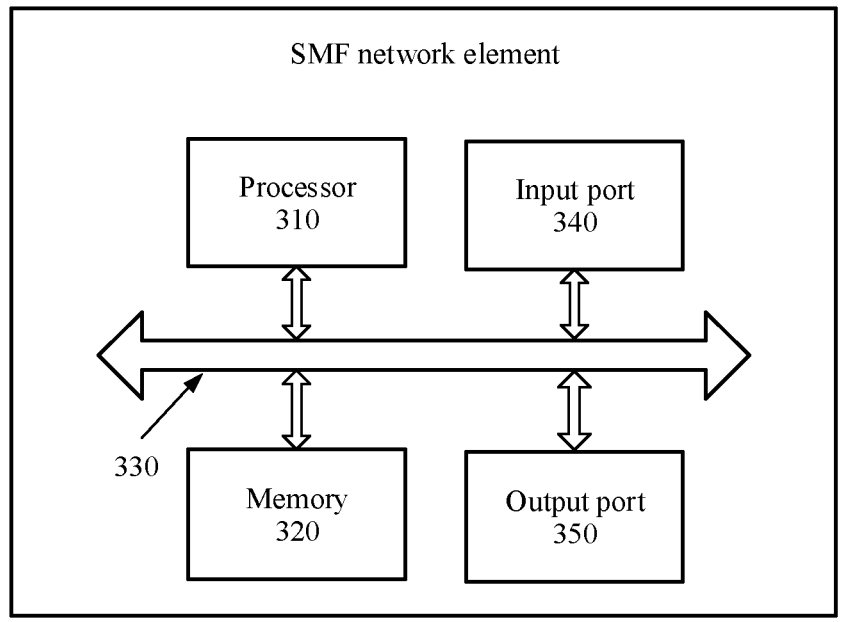
FIG. 16 is a schematic composition diagram of an SMF network element according to an embodiment of this application.

FIG. 16 is a schematic composition diagram of another SMF network element according to an embodiment of this application. The SMF network element may include a processor 310, a memory 320, and a bus 330. The processor 310 is connected to the memory 320 through the bus 330. The memory 320 is configured to store instructions. The processor 310 is configured to execute the instructions stored in the memory 320, to implement the steps performed by the SMF network element in the methods corresponding to FIG. 2 to FIG. 7.

Further, the SMF network element may further include an input port 340 and an output port 350. The processor 310, the memory 320, the input port 340, and the output port 350 may be connected through the bus 330.

The processor 310 is configured to execute the instructions stored in the memory 320, to control the input port 340 to receive a signal and control the output port 350 to send a signal, so as to complete the steps performed by the SMF network element in the foregoing methods. The input port 340 and the output port 350 may be a same physical entity or different physical entities. When the input port 340 and the output port 350 are a same physical entity, the input port 340 and the output port 350 may be collectively referred to as an input/output port. The memory 320 may be integrated into the processor 310, or may be disposed separately from the processor 310.

In an implementation, functions of the input port 340 and the output port 350 may be implemented by using a transceiver circuit or a dedicated transceiver chip. The processor 310 may be implemented by using a dedicated processing chip, a processing circuit, a processor, or a general-purpose chip.

In another implementation, the SMF network element provided in this embodiment of this application may be implemented in a form of a general-purpose computer. To be specific, program code used to implement functions of the processor 310, the input port 340, and the output port 350 is stored in the memory, and a general-purpose processor executes the code in the memory, to implement the functions of the processor 310, the input port 340, and the output port 350.

For concepts, explanations, detailed descriptions, and other steps of the SMF network element that are related to the technical solutions provided in this embodiment of this application, refer to the descriptions of the content in the foregoing method embodiments or other embodiments. Details are not described herein again.

Figure 17:
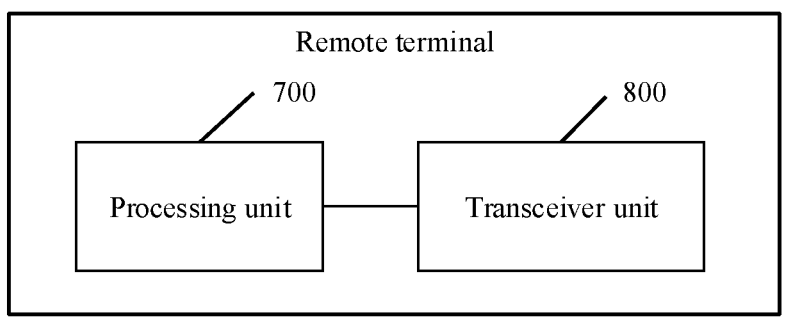
FIG. 17 is a schematic composition diagram of a remote terminal according to an embodiment of this application.

FIG. 17 is a schematic composition diagram of a remote terminal according to an embodiment of this application. The remote terminal may include a processing unit 700 and a transceiver unit 800.

The processing unit 700 is configured to indicate the transceiver unit 800 to send relay communication indication information to a relay terminal, where the relay communication indication information is used to indicate the remote terminal to perform relay communication; and the transceiver unit 800 is configured to receive first QoS information from the relay terminal, where the first QoS information is used to transmit data of the remote terminal between the remote terminal and the relay terminal.

Optionally, the relay communication indication information is carried in a data packet unit PDU session establishment request.

Optionally, the first QoS information is associated with second QoS information, and the second QoS information is used to transmit the data of the remote terminal between the relay terminal and a user plane function UPF network element.

Optionally, the transceiver unit 800 is further configured to:

receive information about a first QoS flow from the relay terminal, where the first QoS flow is used to carry the data of the remote terminal transmitted between the remote terminal and the relay terminal.

For concepts, explanations, detailed descriptions, and other steps of the remote terminal that are related to the technical solutions provided in this embodiment of this application, refer to the descriptions of the content in the foregoing method embodiments or other embodiments. Details are not described herein again.

Figure 18:
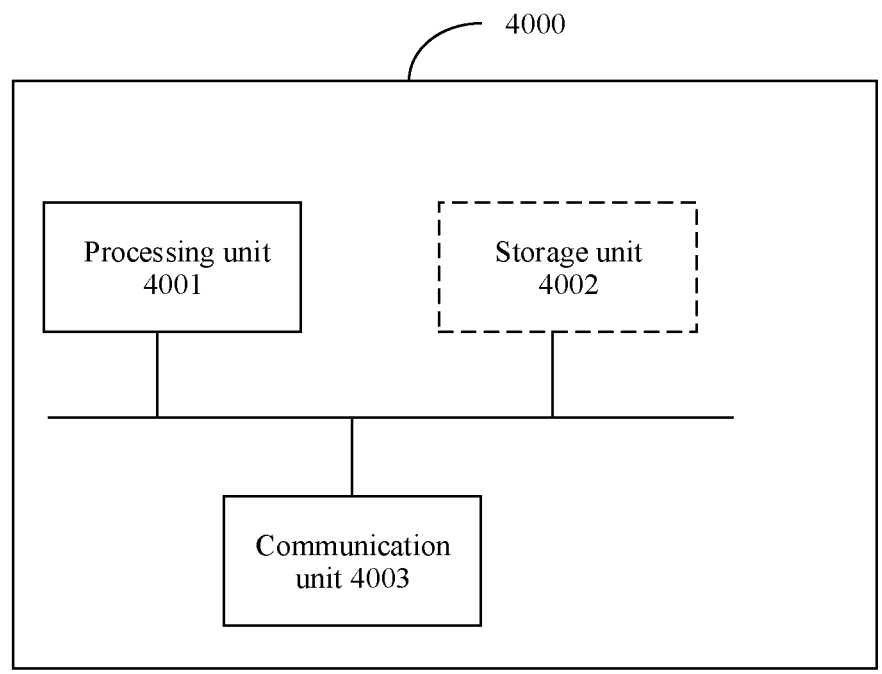
FIG. 18 is a schematic composition diagram of a communication apparatus according to an embodiment of this application.

FIG. 18 is a schematic composition diagram of a communication apparatus according to an embodiment of this application. The communication apparatus 4000 may be the remote terminal in embodiments of this application, or a chip or a system-on-a-chip in the remote terminal. The communication apparatus 4000 may include a processing unit 4001, a storage unit 4002, and a communication unit 4003.

Optionally, the communication unit 4003 in the communication apparatus 4000 may include an antenna and a transceiver of the remote terminal.

The communication apparatus 4000 may be the chip in the remote terminal in embodiments of this application, and the communication unit 4003 may be an input or output interface, a pin, a circuit, or the like. Optionally, the storage unit 4002 may store computer-executable instructions related to the method performed on a remote terminal side, so that the processing unit 4001 performs the method on the remote terminal side in the foregoing embodiments. The storage unit 4002 may be a register, a cache, a RAM, or the like, and the storage unit 4002 may be integrated with the processing unit 4001. The storage unit 4002 may be a ROM or another type of static storage device that can store static information and instructions, and the storage unit 4002 may be independent of the processing unit 4001. Optionally, with development of wireless communication technologies, the transceiver may be integrated into the communication apparatus 4000. For example, the transceiver and a network interface are integrated into the communication unit 4003.

When the communication apparatus 4000 is the remote terminal in embodiments of this application or the chip in the remote terminal, the method performed by the remote terminal in the foregoing embodiments can be implemented.

The processing unit 4001 may indicate the communication unit 4003 to send relay communication indication information to a relay terminal, and the communication unit 4003 receives first QoS information from the relay terminal. The communication unit 4003 may further receive, from the relay terminal, information about a first QoS flow. For specific information exchange, refer to related content in FIG. 2 to FIG. 7.

The storage unit 4002 may store the QoS information and the QoS flow information.

For concepts, explanations, detailed descriptions, and other steps of the communication apparatus 4000 that are related to the technical solutions provided in this embodiment of this application, refer to the descriptions of the content in the foregoing method embodiments or other embodiments. Details are not described herein again.

Figure 19:
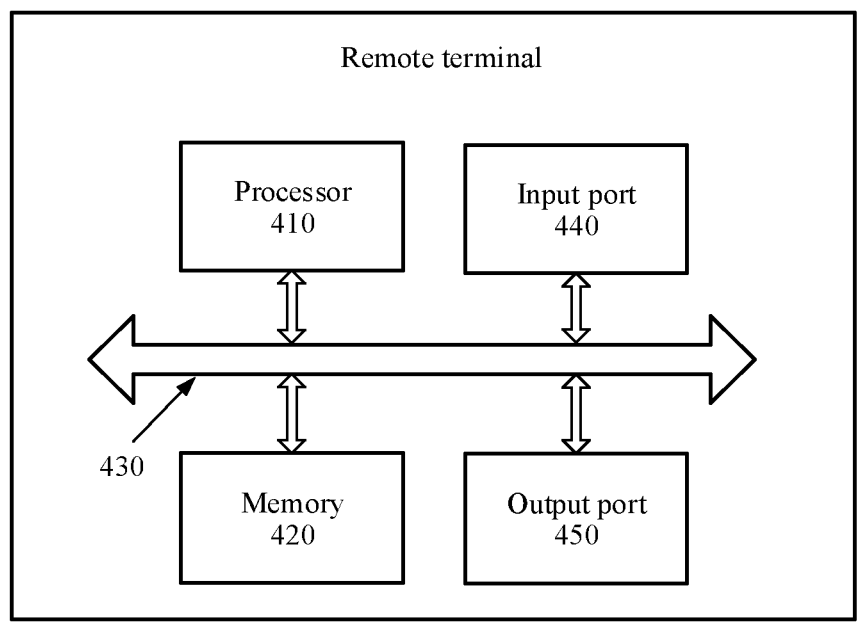
FIG. 19 is a schematic composition diagram of another remote terminal according to an embodiment of this application.

FIG. 19 is a schematic composition diagram of another remote terminal according to an embodiment of this application. The remote terminal may include a processor 410, a memory 420, and a bus 430. The processor 410 is connected to the memory 420 through the bus 430. The memory 420 is configured to store instructions. The processor 410 is configured to execute the instructions stored in the memory 420, to implement the steps performed by the remote terminal in the methods corresponding to FIG. 2 to FIG. 7.

Further, the remote terminal may further include an input port 440 and an output port 450. The processor 410, the memory 420, the input port 440, and the output port 450 may be connected through the bus 430.

The processor 410 is configured to execute the instructions stored in the memory 420, to complete the steps performed by the remote terminal in the foregoing methods. The input port 440 and the output port 450 may be a same physical entity or different physical entities. When the input port 440 and the output port 450 are a same physical entity, the input port 440 and the output port 450 may be collectively referred to as an input/output port. The memory 420 may be integrated into the processor 410, or may be disposed separately from the processor 410.

In an implementation, functions of the input port 440 and the output port 450 may be implemented by using a transceiver circuit or a dedicated transceiver chip. The processor 410 may be implemented by using a dedicated processing chip, a processing circuit, a processor, or a general-purpose chip.

In another implementation, the remote terminal provided in this embodiment of this application may be implemented in a form of a general-purpose computer. To be specific, program code used to implement functions of the processor 410, the input port 440, and the output port 450 is stored in the memory, and a general-purpose processor executes the code in the memory, to implement the functions of the processor 410, the input port 440, and the output port 450.

For concepts, explanations, detailed descriptions, and other steps of the remote terminal that are related to the technical solutions provided in this embodiment of this application, refer to the descriptions of the content in the foregoing method embodiments or other embodiments. Details are not described herein again.

A person skilled in the art may understand that, for ease of description, FIG. 11, FIG. 13, and FIG. 15 show only one memory and only one processor. An actual controller may include a plurality of processors and a plurality of memories. The memory may also be referred to as a storage medium, a storage device, or the like. This is not limited in embodiments of this application. In embodiments of this application, the processor may be a central processing unit (CPU for short), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like. The memory may include a read-only memory and a random access memory, and provide instructions and data to the processor. A part of the memory may further include a non-volatile random access memory. In addition to a data bus, the bus may further include a power bus, a control bus, a status signal bus, and the like. However, for clear description, various types of buses in the figures are marked as the bus.

According to the method, the relay terminal, the remote terminal, the PCF network element, and the SMF network element provided in embodiments of this application, an embodiment of this application further provides a communication system. For a relationship among the devices and an instruction procedure, refer to the descriptions of embodiments in FIG. 1 to FIG. 7. Details are not described herein again.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with illustrative logical blocks described in embodiments disclosed in this specification and steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

All or a part of foregoing embodiments may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid-State Drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for managing quality of service (QOS), comprising:
obtaining, by a relay terminal, QOS information from a network device, wherein the QoS information comprises second QoS information for a second QoS flow between the relay terminal and a user plane function network element, the second QoS flow being used for carrying data of a remote terminal communicatively connected with the relay terminal; and
sending, by the relay terminal to the remote terminal based on the QoS information, first QoS information for a first QoS flow between the remote terminal and the relay terminal, the first QoS flow being used for carrying the data of the remote terminal and determined by the relay terminal based on the second QoS information included in the QoS information.

2. The method of claim 1, wherein the obtaining, by the relay terminal, the QoS information comprises:
receiving, by the relay terminal, the QoS information from a session management function network element.

3. The method of claim 1, wherein the second QoS information comprises a 5G QoS identifier (5QI), and the first QoS information comprises a PC5 5QI (PQI).

4. The method of claim 3, further comprising:
determining, by the relay terminal in response to obtaining the 5QI from the network device, the PQI based on a mapping relationship between the 5QI and the PQI.

5. The method of claim 4, wherein the mapping relationship between the 5QI and the PQI is obtained by the relay terminal from a policy control function (PCF) network element.

6. The method of claim 4, wherein the mapping relationship between the 5QI and the PQI is preconfigured in the relay terminal.

7. The method of claim 3, wherein the second QoS information further comprises: a second guaranteed flow bit rate (GFBR) and a second maximum flow bit rate (MFBR) for the second QoS flow; and the method further comprises:
setting, by the relay terminal, a first GFBR and a first MFBR for the first QoS flow to the same values of the second GFBR and the second MFBR, respectively.

8. A relay terminal, comprising:
a memory storing instructions; and
at least one processor in communication with the memory, the at least one processor configured, upon execution of the instructions, to perform the following steps:
obtaining quality of service (QOS) information from a network device, wherein the QoS information comprises second QoS information for a second QoS flow between the relay terminal and a user plane function network element, the second QoS flow being used for carrying data of a remote terminal communicatively connected with the relay terminal; and
sending, to the remote terminal based on the QoS information, first QoS information for a first QoS flow between the remote terminal and the relay terminal, the first QoS flow being used for carrying the data of the remote terminal and determined based on the second QoS information included in the QoS information.

9. The relay terminal of claim 8, wherein the second QoS information comprises a 5G QoS identifier (5QI), and the first QoS information comprises a PC5 5QI (PQI).

10. The relay terminal of claim 9, wherein the at least one processor is further to perform the following step: after obtaining the 5QI from the network device, determining the PQI based on a mapping relationship between the 5QI and the PQI.

11. The relay terminal of claim 10, wherein the mapping relationship between the 5QI and the PQI is obtained by the relay terminal from a policy control function (PCF) network element or is preconfigured in the relay terminal.

12. The relay terminal of claim 10, wherein the second QoS information further comprises: a second guaranteed flow bit rate (GFBR) and a second maximum flow bit rate (MFBR) for the second QoS flow; and the at least one processor is further to perform the following step:
setting a first GFBR and a first MFBR for the first QoS flow to the same values of the second GFBR and the second MFBR, respectively.

13. A non-transitory computer-readable storage medium storing a program code executable by a processor of a relay terminal, the program code comprising instructions for:
obtaining quality of service (QOS) information from a network device, wherein the QoS information comprises second QoS information for a second QoS flow between the relay terminal and a user plane function network element, wherein the second QoS flow is used for carrying data of a remote terminal communicatively connected with the relay terminal; and
sending, to the remote terminal based on the QoS information, first QoS information for a first QoS flow between the remote terminal and the relay terminal, wherein the first QoS flow is used for carrying the data of the remote terminal and is determined based on the second QoS information included in the QoS information.

14. The non-transitory computer-readable storage medium of claim 13, wherein the obtaining the QoS information comprises:
receiving the QoS information from a session management function network element.

15. The non-transitory computer-readable storage medium of claim 13, wherein the second QoS information comprises a 5G QOS identifier (5QI), and the first QOS information comprises a PC5 5QI (PQI).

16. The non-transitory computer-readable storage medium of claim 15, wherein the program code further comprises instructions for: after obtaining the 5QI from the network device, determining the PQI based on a mapping relationship between the 5QI and the PQI.

17. The non-transitory computer-readable storage medium of claim 16, wherein the mapping relationship between the 5QI and the PQI is obtained by the relay terminal from a policy control function (PCF) network element or is preconfigured in the relay terminal.

18. The non-transitory computer-readable storage medium of claim 16, wherein the second QoS information further comprises: a second guaranteed flow bit rate (GFBR) and a second maximum flow bit rate (MFBR) for the second QoS flow; and the program code further comprises instructions for:

setting a first GFBR and a first MFBR for the first QoS flow to the same values of the second GFBR and the second MFBR, respectively.

* * * * *